(12) United States Patent
Sindhwani et al.

(10) Patent No.: US 12,586,478 B2
(45) **Date of Patent: *Mar. 24, 2026**

(54) UNSUPERVISED ANOMALY DETECTION FOR AUTONOMOUS VEHICLES

(71) Applicant: Wing Aviation LLC, Mountain View, CA (US)

(72) Inventors: Vikas Sindhwani, Redwood City, CA (US); Hakim Sidahmed, Redwood City, CA (US); Krzysztof Choromanski, Redwood City, CA (US); Brandon L. Jones, Redwood City, CA (US)

(73) Assignee: Wing Aviation LLC, Palo Alto, CA (US)

(*) Notice: Subject to any disclaimer, the term of this patent is extended or adjusted under 35 U.S.C. 154(b) by 163 days.

This patent is subject to a terminal disclaimer.

(21) Appl. No.: 18/495,640

(22) Filed: Oct. 26, 2023

(65) Prior Publication Data

US 2024/0071236 A1 Feb. 29, 2024

Related U.S. Application Data

(63) Continuation of application No. 16/887,194, filed on May 29, 2020, now Pat. No. 11,823,562.

(Continued)

(51) Int. Cl.
*G08G 5/55* (2025.01)
*B64F 5/60* (2017.01)
(Continued)

(52) U.S. Cl.
CPC ............... *G08G 5/55* (2025.01); *B64F 5/60* (2017.01); *B64U 10/25* (2023.01); *B64U 50/13* (2023.01);
(Continued)

(58) Field of Classification Search
CPC .. G08G 5/55; G08G 5/57; G08G 5/58; G08G 5/21; G08G 5/53; G05D 1/0011;
(Continued)

(56) References Cited

U.S. PATENT DOCUMENTS

2018/0327091 A1* 11/2018 Burks .................... B64U 50/13
2018/0346151 A1* 12/2018 Sturlaugson ........... G06N 20/20
(Continued)

FOREIGN PATENT DOCUMENTS

CN        109035488 A   12/2018
EP          3415416 A1  12/2018
(Continued)

OTHER PUBLICATIONS

B. Wang, Z. Wang, L. Liu, D. Liu and X. Peng, "Data-Driven Anomaly Detection for UAV Sensor Data Based on Deep Learning Prediction Model," 2019 Prognostics and System Health Management Conference (PHM-Paris), 2019, pp. 286-290, doi: 10.1109/PHM-Paris.2019.00055. (Year: 2019).*
(Continued)

*Primary Examiner* — Aniss Chad
*Assistant Examiner* — Christine Nguyen Huynh
(74) *Attorney, Agent, or Firm* — Christensen O'Connor Johnson Kindness PLLC

(57) ABSTRACT

In some embodiments, techniques are provided for analyzing time series data to detect anomalies. In some embodiments, the time series data is processed using a machine learning model. In some embodiments, the machine learning model is trained in an unsupervised manner on large amounts of previous time series data, thus allowing highly accurate models to be created from novel data. In some embodiments, training of the machine learning model alternates between a fitting optimization and a trimming optimization to allow large amounts of training data that includes (Continued)

untagged anomalous records to be processed. Because a machine learning model is used, anomalies can be detected within complex systems, including but not limited to autonomous vehicles such as unmanned aerial vehicles. When anomalies are detected, commands can be transmitted to the monitored system (such as an autonomous vehicle) to respond to the anomaly.

20 Claims, 18 Drawing Sheets

Related U.S. Application Data

(60) Provisional application No. 62/900,380, filed on Sep. 13, 2019.

(51) Int. Cl.
| | |
|---|---|
| *B64U 10/25* | (2023.01) |
| *B64U 50/13* | (2023.01) |
| *G05D 1/00* | (2024.01) |
| *G08G 5/57* | (2025.01) |
| *G08G 5/58* | (2025.01) |

(52) U.S. Cl.
CPC ......... *G05D 1/0011* (2013.01); *G05D 1/0055* (2013.01); *G05D 1/105* (2013.01); *G08G 5/57* (2025.01); *G08G 5/58* (2025.01); *B64U 2201/20* (2023.01)

(58) Field of Classification Search
CPC .. G05D 1/0055; G05D 1/105; B64U 2201/20; B64U 10/25; B64U 50/13; G06F 2201/81; G06F 11/0736; G06F 11/0751; G06F 11/0772; G06F 11/079; G06F 11/3013; G06F 11/3447; G07C 5/0808; G06N 20/00; B64F 5/60
See application file for complete search history.

(56) References Cited

U.S. PATENT DOCUMENTS

| | | | |
|---|---|---|---|
| 2019/0114564 A1 | 4/2019 | Ferguson et al. | |
| 2020/0115061 A1 | 4/2020 | Takeuchi et al. | |
| 2020/0201727 A1* | 6/2020 | Nie .......................... | G06N 20/00 |

FOREIGN PATENT DOCUMENTS

| | | |
|---|---|---|
| JP | 2017217942 A | 12/2017 |
| JP | 2018158631 A | 10/2018 |
| KR | 1020180064155 A | 6/2018 |

OTHER PUBLICATIONS

Chu, E., and Gorinevsky, D., "Detecting Aircraft Performance Anomalies from Cruise Flight Data," AIAA Infotech @ Aerospace Conference, Atlanta, GA, Apr. 2010, 79 pages.

Dani, C.D., et al., "Unsupervised Anomaly Detection for Aircraft Condition Monitoring System," 2015 IEEE Aerospace Conference, Mar. 7-14, 2015, 3 pages.

Janakiraman, V.M., et al. "Anomaly Detection in Aviation Data Using Extreme Learning Machines," 2016 International Joint Conference on Neural Networks (IJCNN), Jul. 24-29, 2016, 3 pages.

International Search Report and Written Opinion mailed Nov. 11, 2020, in corresponding International Patent Application No. PCT/US2020/044974, 11 pages.

S. Akash, "Anomaly Detection for Temporal Data using Long Short-Term Memory (LSTM)", 2017, KTH Information and Communication Technology (Year: 2017).

A. Manukyan, M.A. Olivares-Mendez, H. Voos and M. Geist, "Real time degradation identification of UAV using machine learning techniques," 2017 International Conference on Unmanned Aircraft Systems (ICUAS), 2017, pp. 1223-1230, doi: 10.1109/ICUAS.2017.7991445. (Year: 2017).

Search Report mailed Apr. 26, 2023, issued in corresponding EP Application No. 20863533.4, filed Aug. 5, 2020, 9 pages.

Wang, B., et al., "Multivariate Regression-Based Fault Detection and Recovery of UAV Flight Data." IEEE transactions of Instrumentation and Measurement, Aug. 15, 2019, vol. 69(6): pp. 3527-3537.

Written Opinion and Search Report mailed Jul. 19, 2023, issued in corresponding Singapore Application No. 11202200438X, filed Aug. 5, 2020, 9 pages.

Office Action mailed Dec. 21, 2020, in corresponding Chinese application No. 202080062796.7, filed Aug. 5, 2020, 33 pages.

AU Examination Report mailed Jul. 19, 2023, in corresponding AU application No. 2020344464, 4 pages.

AU Examination Report mailed Jul. 19, 2025, in corresponding AU application No. 2024200630, 3 pages.

CN Office Action mailed Oct. 11, 2025, in corresponding CN application No. 202080062796.7, 9 pages.

* cited by examiner

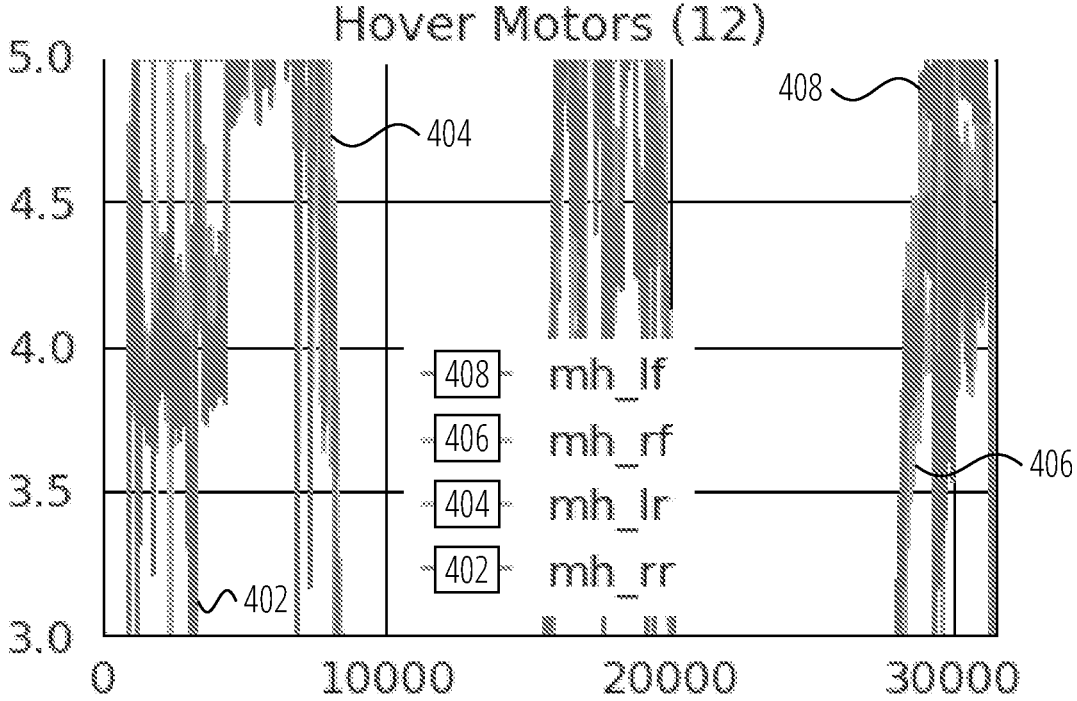
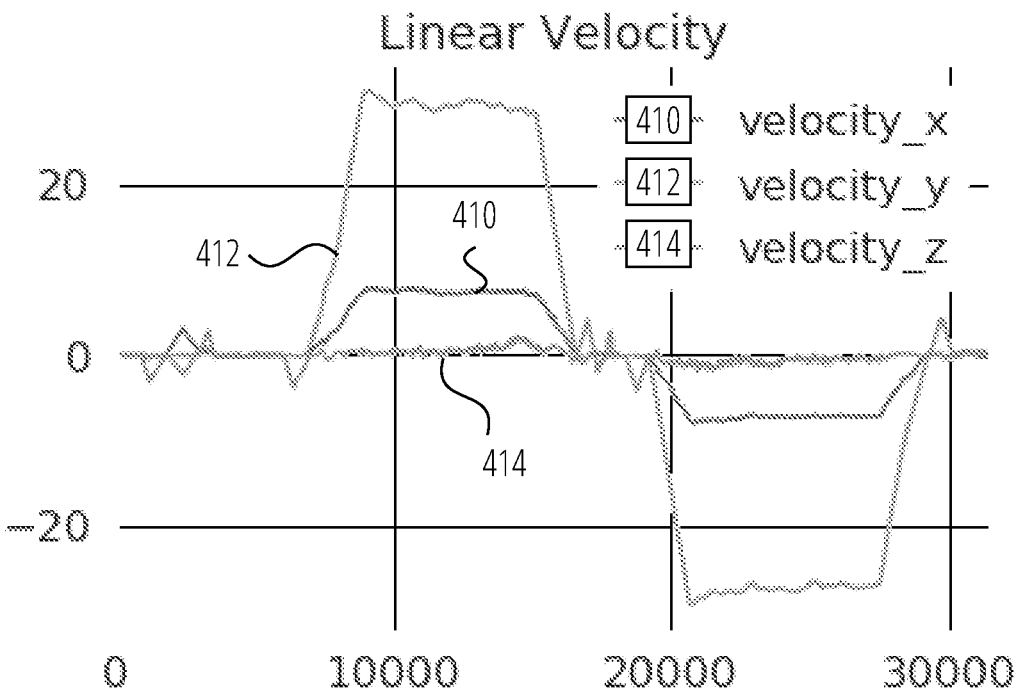
FIG. 4

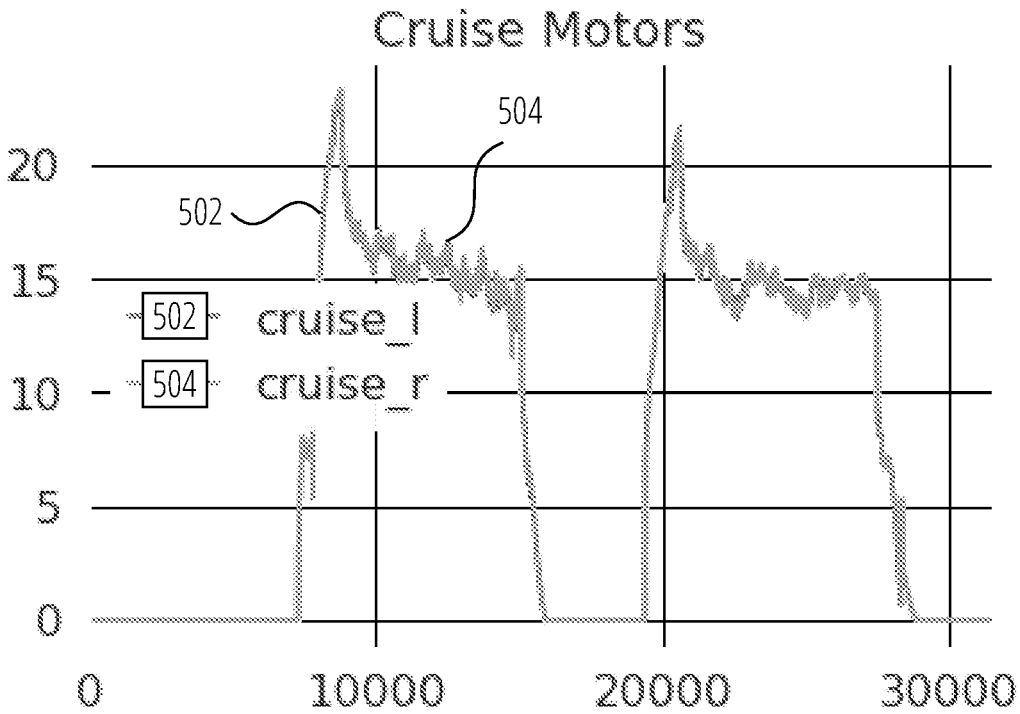
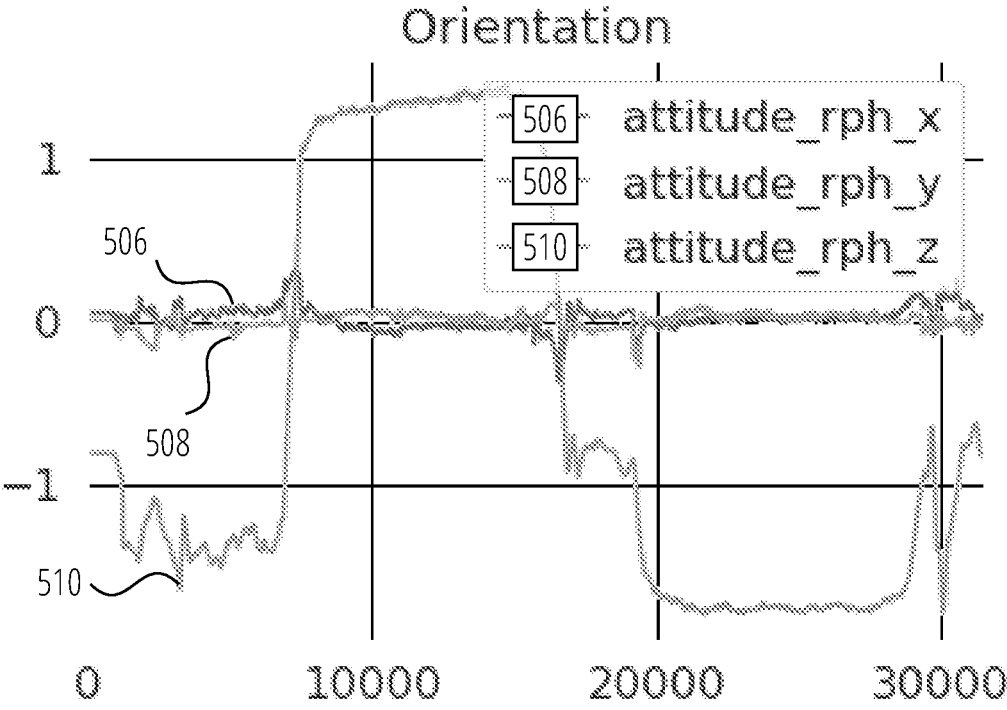
FIG. 5

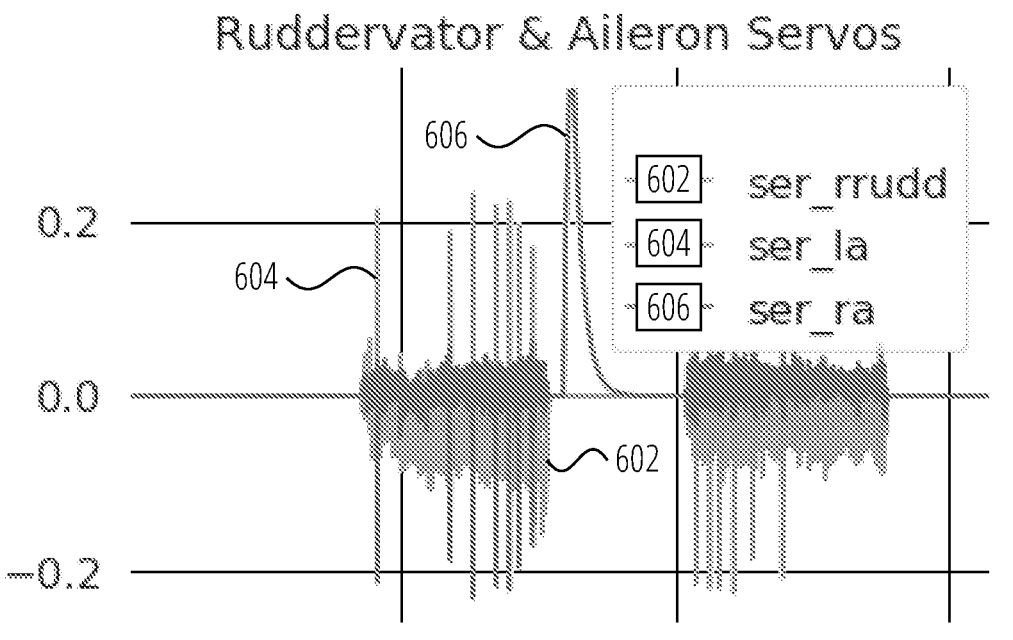
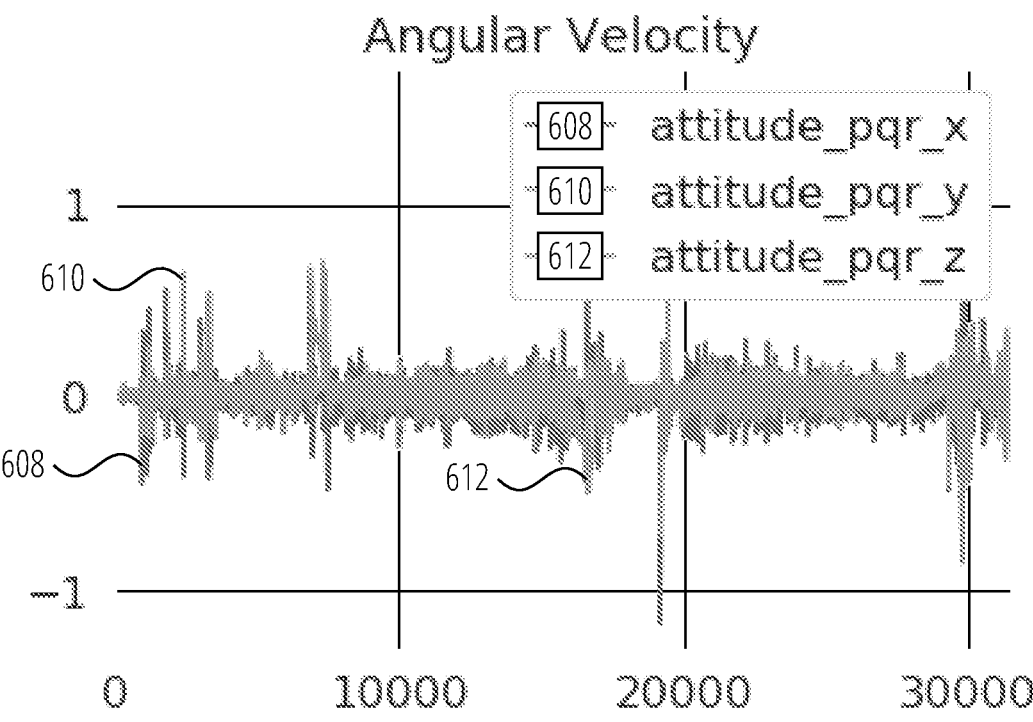
FIG. 6

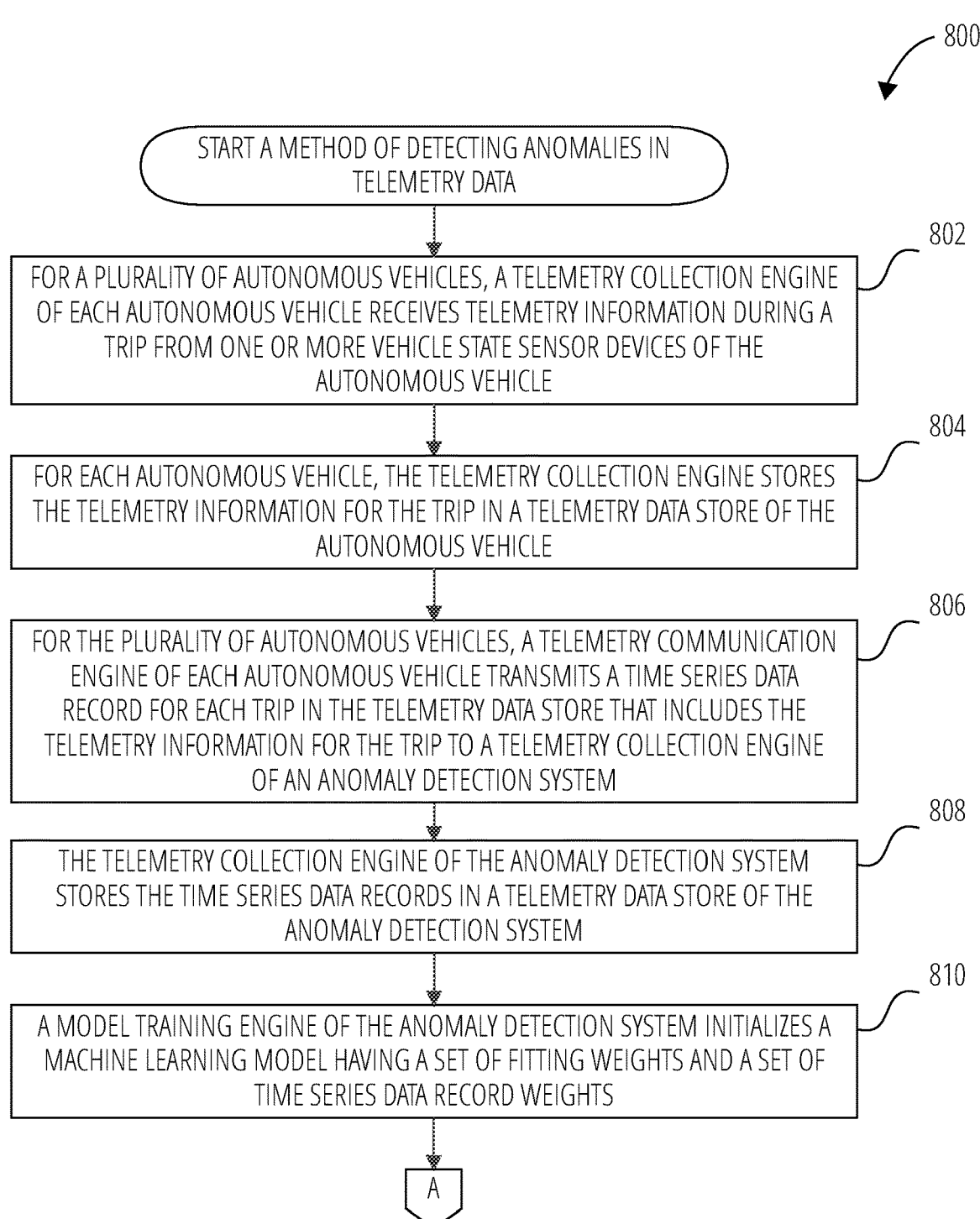

800

START A METHOD OF DETECTING ANOMALIES IN
TELEMETRY DATA

802

FOR A PLURALITY OF AUTONOMOUS VEHICLES, A TELEMETRY COLLECTION ENGINE
OF EACH AUTONOMOUS VEHICLE RECEIVES TELEMETRY INFORMATION DURING A
TRIP FROM ONE OR MORE VEHICLE STATE SENSOR DEVICES OF THE
AUTONOMOUS VEHICLE

804

FOR EACH AUTONOMOUS VEHICLE, THE TELEMETRY COLLECTION ENGINE STORES
THE TELEMETRY INFORMATION FOR THE TRIP IN A TELEMETRY DATA STORE OF THE
AUTONOMOUS VEHICLE

806

FOR THE PLURALITY OF AUTONOMOUS VEHICLES, A TELEMETRY COMMUNICATION
ENGINE OF EACH AUTONOMOUS VEHICLE TRANSMITS A TIME SERIES DATA
RECORD FOR EACH TRIP IN THE TELEMETRY DATA STORE THAT INCLUDES THE
TELEMETRY INFORMATION FOR THE TRIP TO A TELEMETRY COLLECTION ENGINE
OF AN ANOMALY DETECTION SYSTEM

808

THE TELEMETRY COLLECTION ENGINE OF THE ANOMALY DETECTION SYSTEM
STORES THE TIME SERIES DATA RECORDS IN A TELEMETRY DATA STORE OF THE
ANOMALY DETECTION SYSTEM

810

A MODEL TRAINING ENGINE OF THE ANOMALY DETECTION SYSTEM INITIALIZES A
MACHINE LEARNING MODEL HAVING A SET OF FITTING WEIGHTS AND A SET OF
TIME SERIES DATA RECORD WEIGHTS

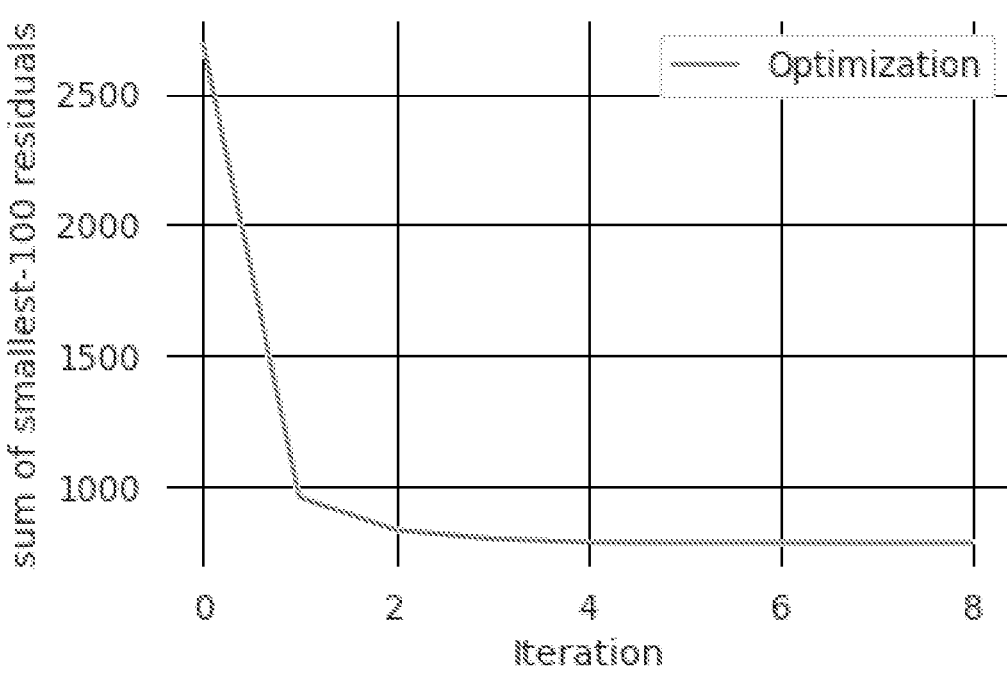
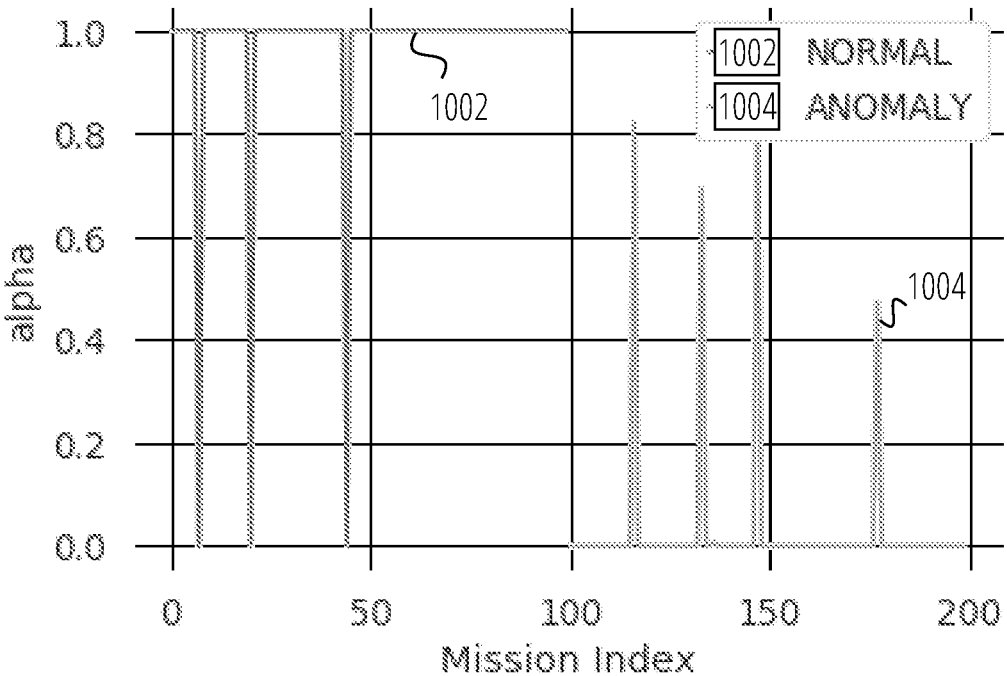
FIG. 10 least-squares: 0.86
soft-l1: 0.96
huber: 0.96
cauchy: 0.93
arctan: 0.89
trim (proposed): 1.00

1102
1104
1106
1108
1110
1112

True Positive Rate

False Positive Rate

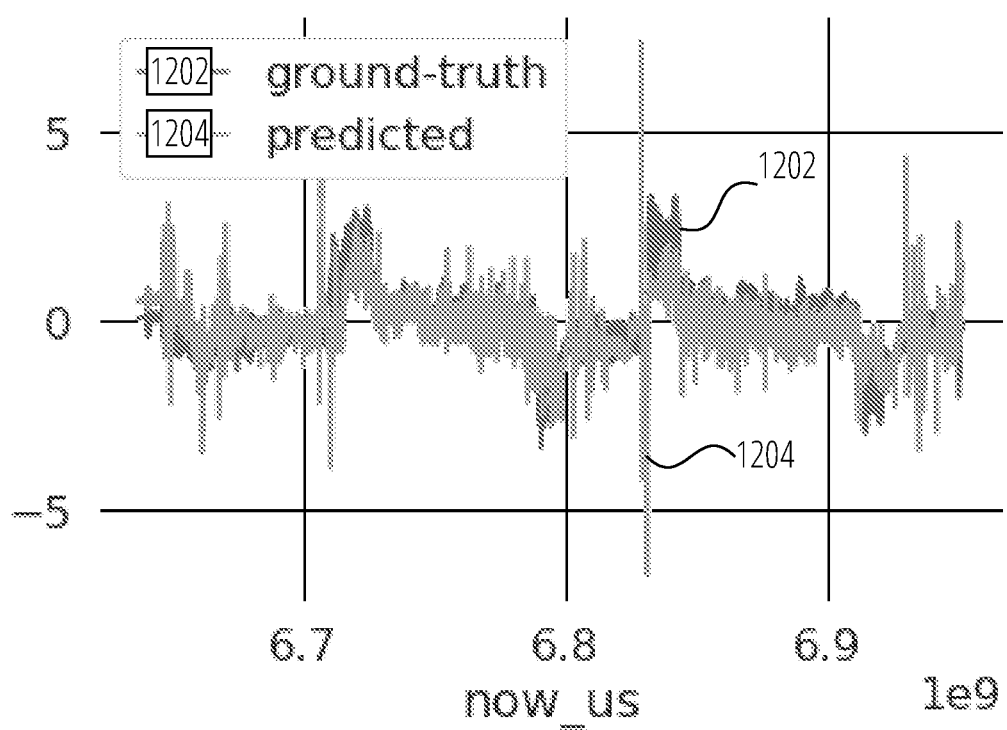
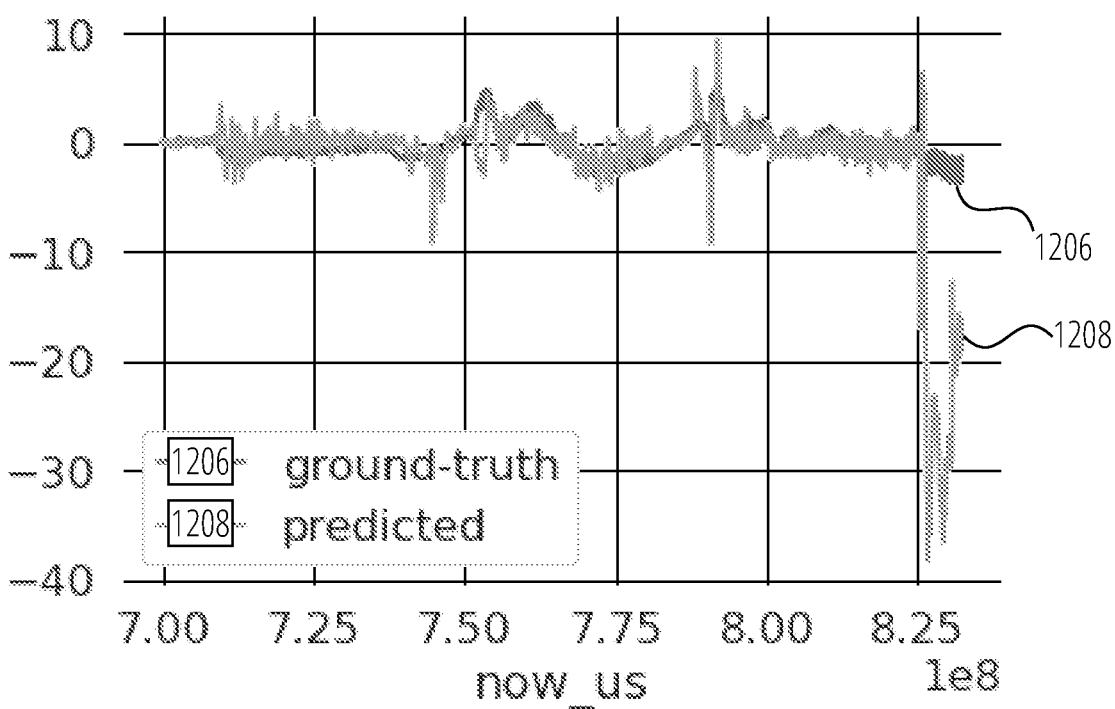
FIG. 12

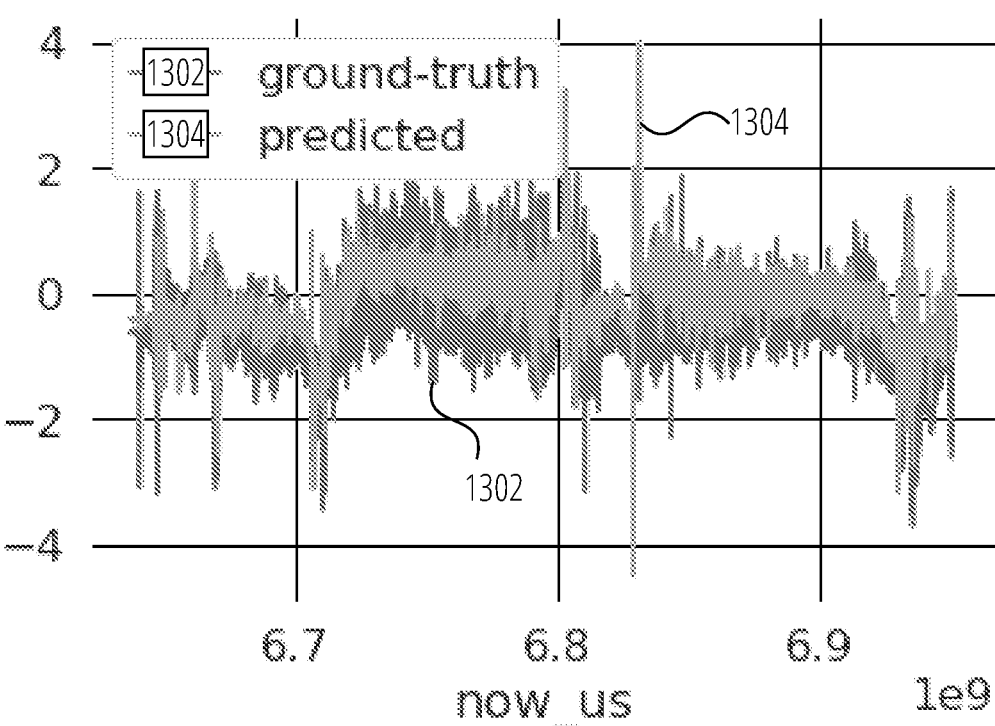
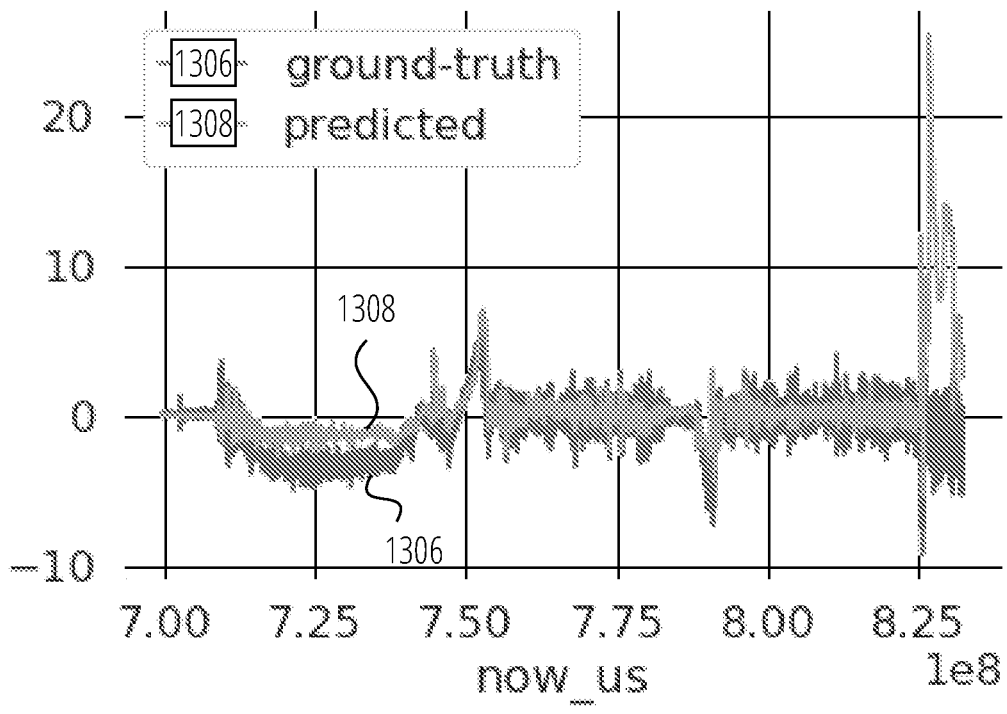
FIG. 13

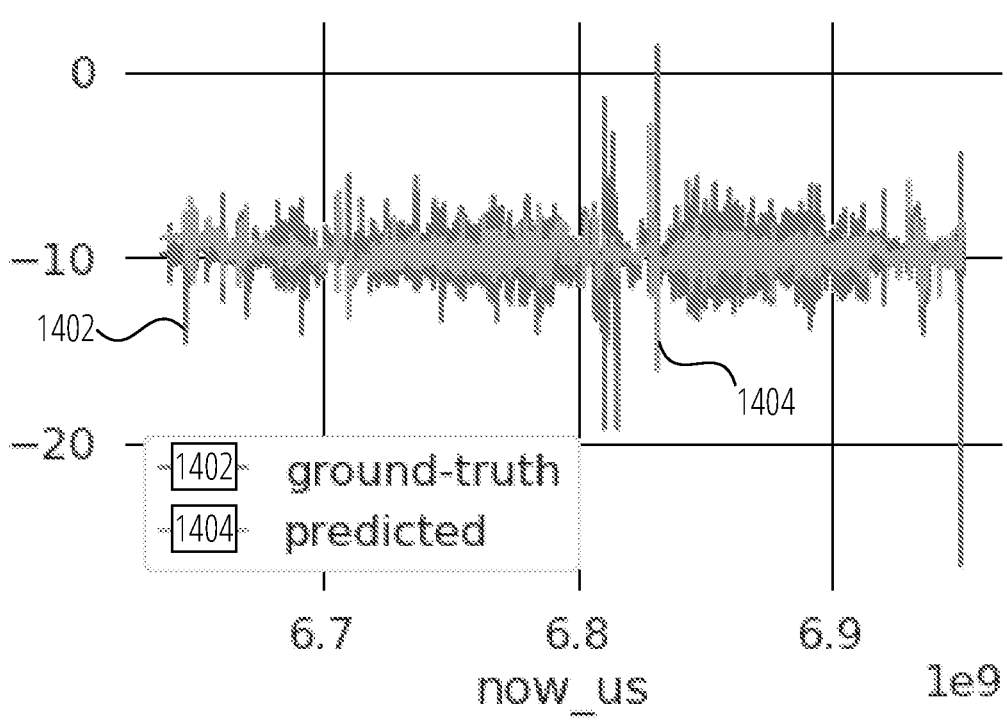
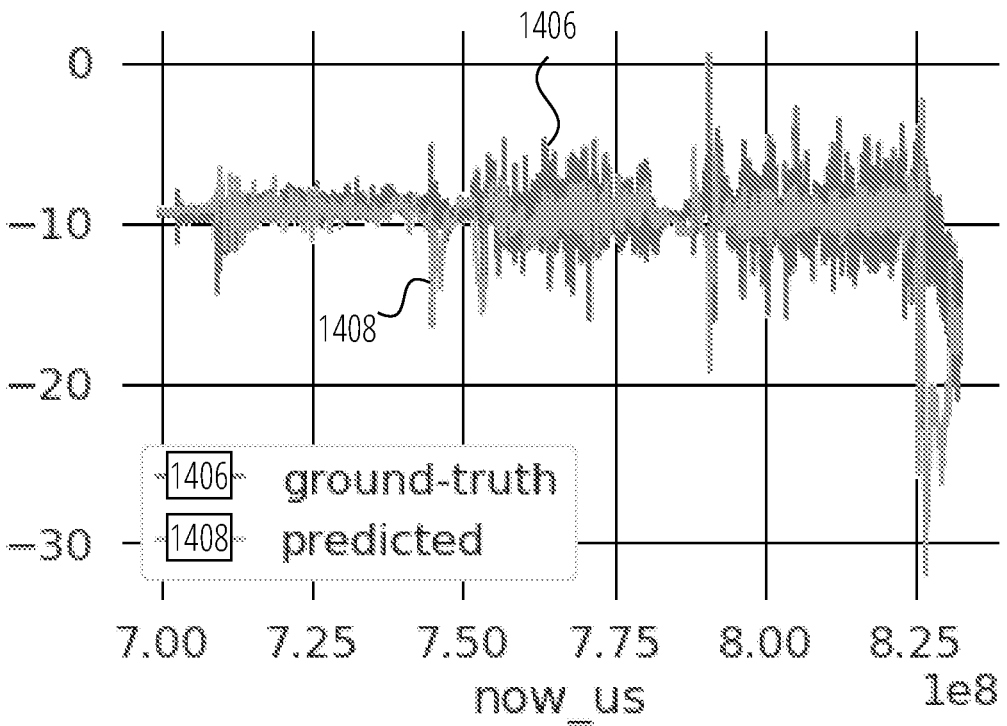
FIG. 14

UNSUPERVISED ANOMALY DETECTION FOR AUTONOMOUS VEHICLES

CROSS-REFERENCE TO RELATED APPLICATIONS

This application is a continuation of U.S. Patent Application No. 16/887,194, filed May 29, 2020, which claims the benefit of Provisional Application No. 62/900,380, filed Sep. 13, 2019, the entire disclosures of which are hereby incorporated by reference herein for all purposes.

TECHNICAL FIELD

This disclosure relates generally to detecting anomalies in time series data, and in particular but not exclusively, relates to detecting anomalies in telemetry information from autonomous vehicles.

BACKGROUND INFORMATION

As aerial robots become increasingly capable of complex navigation, perceptual reasoning and ability to learn from experience, it is expected that a large number of delivery missions will soon be executed by small air-vehicles taking off autonomously, flying far beyond line of sight over densely populated areas, hovering inside a residential zone within touching distance of humans to deliver the package, and returning to their "home" upon mission completion. Ensuring as high degree of operational reliability and safety as passenger airplanes is critical for delivery drones to achieve economies of scale.

SUMMARY OF INVENTION

In some embodiments, a non-transitory computer-readable medium is provided. The computer-readable medium has logic stored thereon that, in response to execution by one or more processors of a computing system, cause the computing system to perform actions for detecting anomalies in time series data records. The actions comprise receiving, by the computing system, a plurality of time series data records; initializing, by the computing system, a machine learning model having a set of fitting weights and a set of time series data record weights; optimizing, by the computing system, the set of fitting weights of the machine learning model while holding the set of trip weights of the machine learning model constant; optimizing, by the computing system, the set of time series data record weights while holding the set of fitting weights constant; and storing, by the computing system, the optimized time series data record weights and the optimized fitting weights for use in monitoring for anomalies.

In some embodiments, a method for detecting anomalies in time series data records is provided. A computing device receives a time series data record from a monitored system. The computing device processes the time series data record using a machine learning model to generate an anomaly score, wherein the machine learning model was trained on a plurality of previous time series data records. The computing device compares the anomaly score to an anomaly threshold value. In response to determining that the anomaly score is greater than the anomaly threshold value the computing device determines an action to be taken to address the anomaly and transmits a command to the monitored system to cause the monitored system to perform the action to address the anomaly.

In some embodiments, a system is provided. The system comprises at least one computing device that includes at least one processor a non-transitory computer-readable medium. The computer-readable medium has logic stored thereon that, in response to execution by the at least one processor, causes the system to perform actions comprising: receiving a time series data record from a monitored system; processing the time series data record using a machine learning model to generate an anomaly score, wherein the machine learning model was trained on a plurality of previous time series data records; comparing the anomaly score to an anomaly threshold value; and in response to determining that the anomaly score is greater than the anomaly threshold value: determining an action to be taken to address the anomaly; and transmitting a command to the monitored system to cause the monitored system to perform the action to address the anomaly.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

FIG. 4-FIG. 6 include several charts that illustrate non-limiting example embodiments of telemetry information collected by an autonomous vehicle according to various aspects of the present disclosure.

FIG. 8 and FIG. 9 are a flowchart that illustrates a non-limiting example embodiment of a method of detecting anomalies in telemetry information according to various aspects of the present disclosure.

FIG. 10 includes charts that illustrate aspects of the results of alternating optimization of the smoothed trimmed loss according to various aspects of the present disclosure.

FIG. 12-FIG. 14 includes several charts that illustrate experimental results of using a machine learning model to detect anomalies according to various aspects of the present disclosure.

DETAILED DESCRIPTION

In some embodiments of the present disclosure, techniques are provided for analyzing time series data to detect anomalies. The time series data is processed using a machine learning model. The machine learning model is trained in an unsupervised manner on large amounts of previous time series data, thus allowing highly accurate models to be created from novel data. Because a machine learning model is used, anomalies can be detected within complex systems, including but not limited to autonomous vehicles such as unmanned aerial vehicles. When anomalies are detected, commands can be transmitted to the monitored system (such as an autonomous vehicle) to respond to the anomaly.

While simple statistical thresholds and logical rules can be hand-designed to trigger on frequently occurring problematic events for an autonomous vehicle (e.g., battery too low, or control surface non-functional), they cannot exhaustively cover all potential future failure modes which are unknown apriori, particularly as a fleet of autonomous vehicles grows in mission complexity and vehicle types. With this motivation, embodiments of the present disclosure provide an anomaly detection system based on a machine learning model that is continuously trained on thousands of time series data records such as flight logs that include telemetry information. When this model reports large predictive errors for a new trip, the autonomous vehicle can be flagged for manual inspection and possibly removed from service for safety until the issue is resolved. Importantly, embodiments of the present disclosure are designed to discover normality, and do not require upfront labeling of normal and anomalous trips or time series data records. Indeed, sifting through thousands of flight logs comprising of dozens of time series looking for subtle abnormalities stretches the limits of what is manually feasible.

The present disclosure is configured to learn a predictive model of time series data records, such as time series data records that reflect flight dynamics. The linear and angular acceleration of an aircraft depend on the aerodynamic forces it is subject to, which are a function of the vehicle state, control commands, dynamic pressure and other flight condition variables. Simple linear or quadratic models trained on historical flight logs show impressive predictive power. The norm of the predictive residuals at a given time for a given flight, or the mean residual over an entire flight can be used as thresholds for anomaly detection. However, in contrast to prior work that focused on large fixed wing passenger aircrafts and cruising performance only, we are interested in monitoring much smaller delivery drones across an entire flight mission that includes takeoff, package delivery, and landing.

Figure 1:
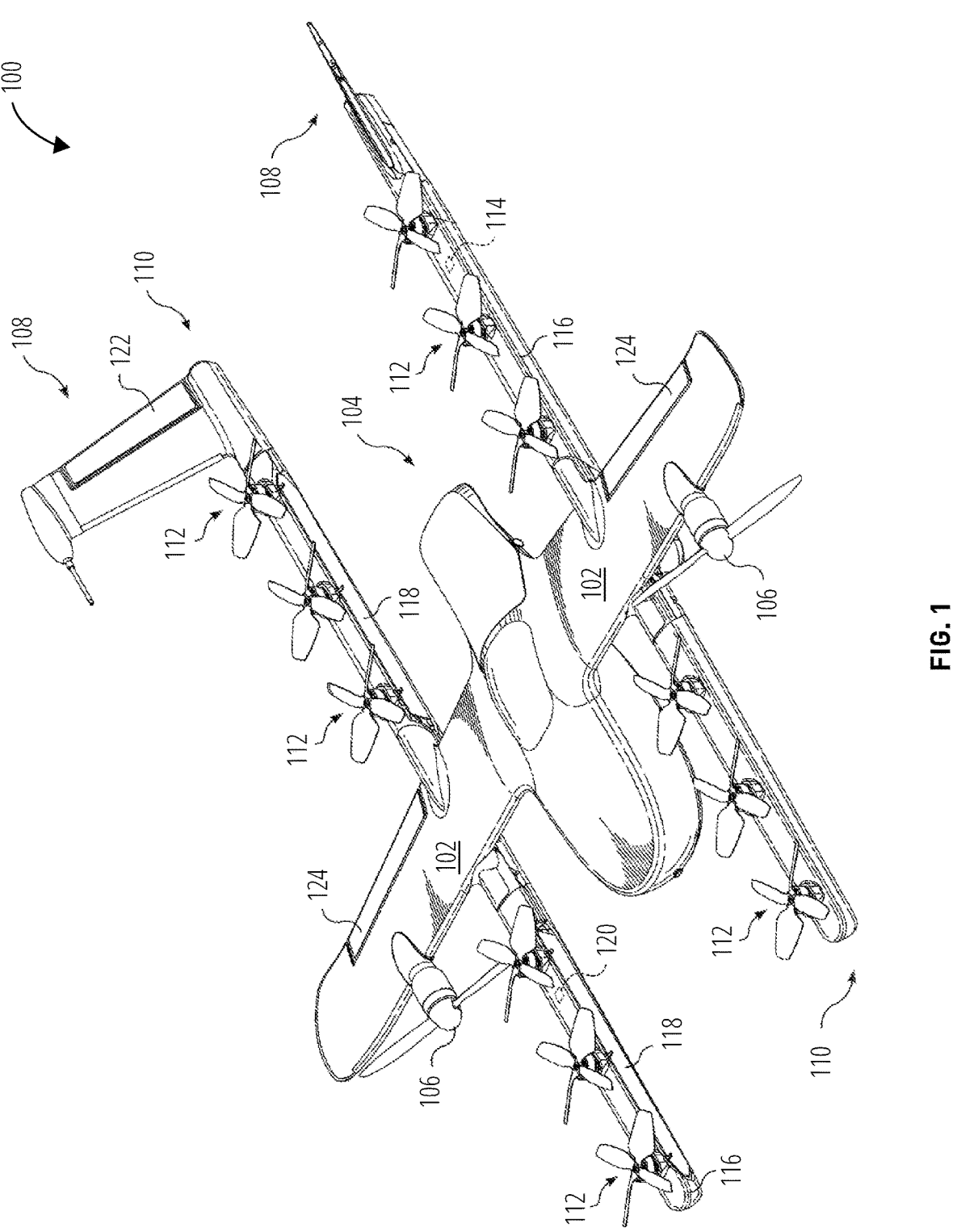
FIG. 1 is a perspective top view illustration of a non-limiting example embodiment of an autonomous vehicle according to various aspects of the present disclosure.
Figure 2:
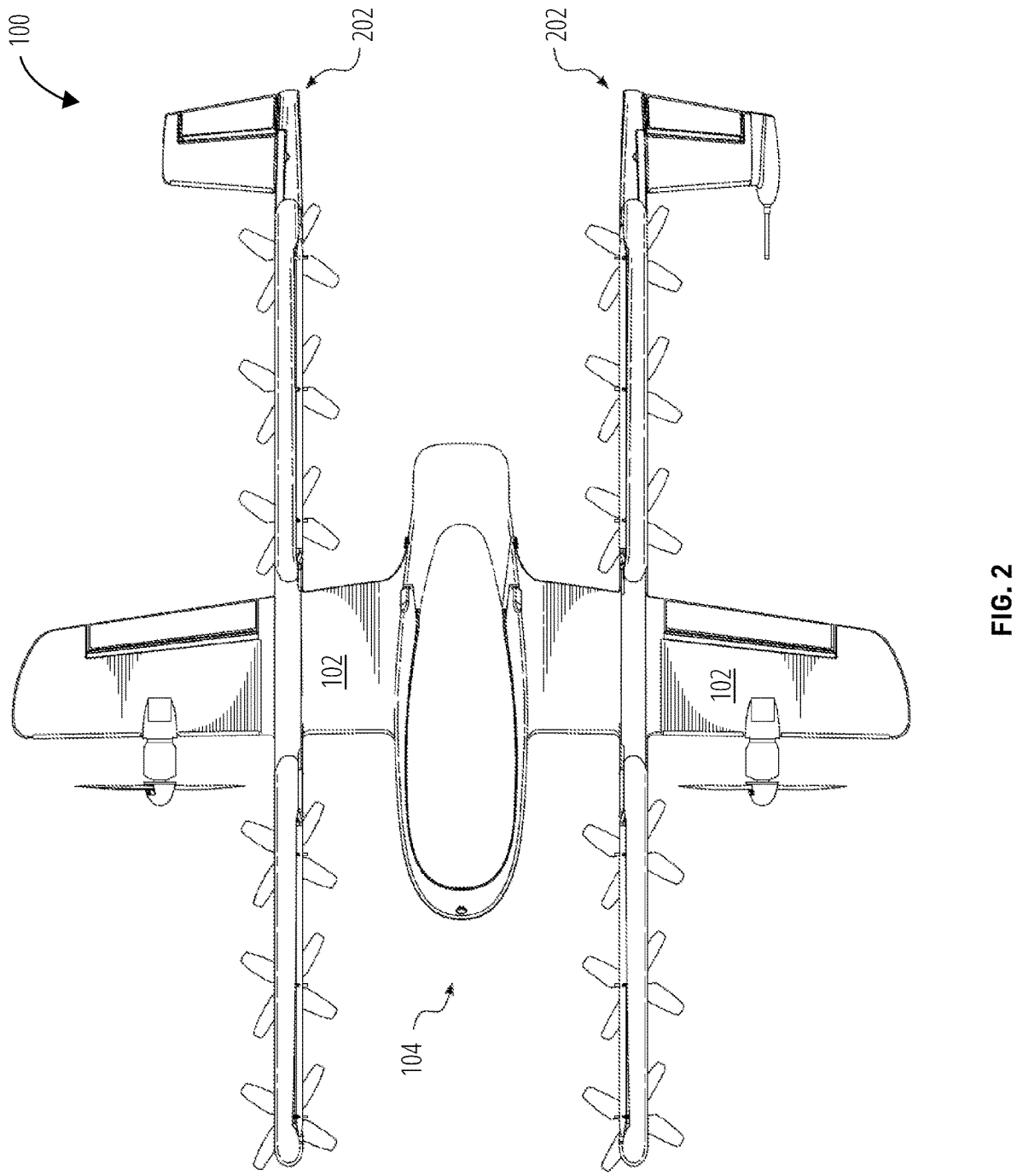
FIG. 2 is a bottom side plan view illustration of the autonomous vehicle illustrated in FIG. 1.

FIG. 1 and FIG. 2 illustrate a non-limiting example embodiment an aerial vehicle or UAV 100, in accordance with an embodiment of the present disclosure. The illustrated embodiment of UAV 100 is a vertical takeoff and landing (VTOL) unmanned aerial vehicle (UAV) that includes separate propulsion units 112 and propulsion units 108 for providing horizontal and vertical propulsion, respectively. UAV 100 is a fixed-wing aerial vehicle, which as the name implies, has a wing assembly 124 that can generate lift based on the wing shape and the vehicle's forward airspeed when propelled horizontally by propulsion units 112. FIG. 1 is a perspective top view illustration of UAV 100 while FIG. 2 is a bottom side plan view illustration of UAV 100.

The illustrated embodiment of UAV 100 includes a fuselage 120. In one embodiment, fuselage 120 is modular and includes a battery module, an avionics module, and a mission payload module. These modules are detachable from each other and mechanically securable to each other to contiguously form at least a portion of the fuselage 120 or UAV main body.

Figure 3:
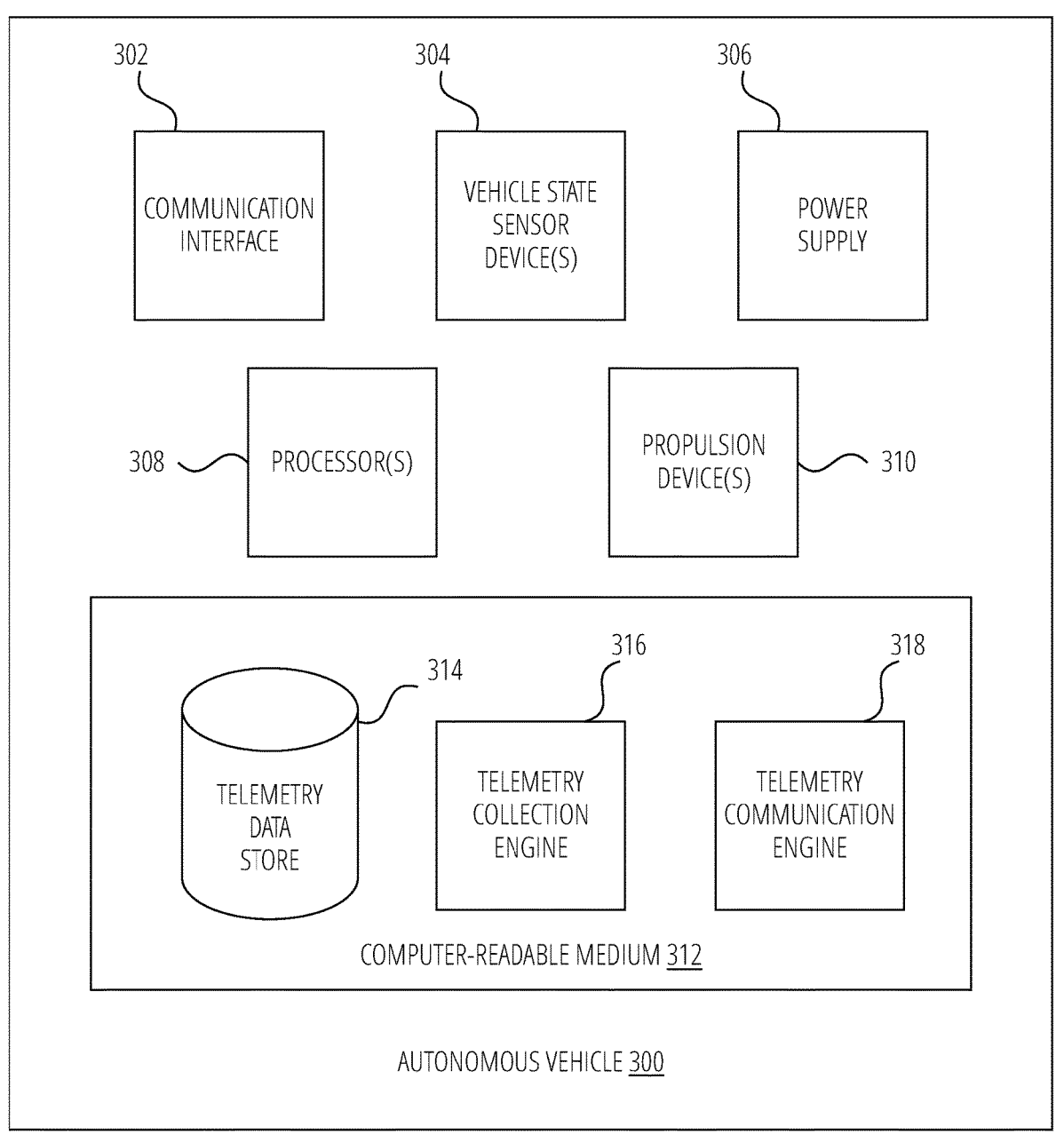
FIG. 3 is a block diagram that illustrates a non-limiting example embodiment of an autonomous vehicle according to various aspects of the present disclosure.

The battery module includes a cavity for housing one or more batteries for powering UAV 100. The avionics module houses flight control circuitry of UAV 100, which may include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.). Other components that may be carried by some embodiments of the UAV 100 are illustrated in FIG. 3.

The illustrated embodiment of UAV 100 further includes horizontal propulsion units 112 positioned on wing assembly 124, which can each include a motor, shaft, motor mount, and propeller, for propelling UAV 100. The illustrated embodiment of UAV 100 includes two boom assemblies 106 that secure to wing assembly 124.

The illustrated embodiments of boom assemblies 106 each include a boom housing 118 in which a boom is disposed, vertical propulsion units 108, printed circuit boards 116, and stabilizers 102. Vertical propulsion units 108 can each include a motor, shaft, motor mounts, and propeller, for providing vertical propulsion. Vertical propulsion units 108 may be used during a hover mode where UAV 100 is descending (e.g., to a delivery location) or ascending (e.g., following a delivery). Stabilizers 102 (or fins) may be included with UAV 100 to stabilize the UAV's yaw (left or right turns) during flight. In some embodiments, UAV 100 may be configured to function as a glider. To do so, UAV 100 may power off its propulsion units and glide for a period of time.

During flight, UAV 100 may control the direction and/or speed of its movement by controlling its pitch, roll, yaw, and/or altitude. For example, the stabilizers 102 may include one or more rudders 104 for controlling the UAV's yaw, and wing assembly 124 may include elevators for controlling the UAV's pitch and/or ailerons 110 for controlling the UAV's roll. As another example, increasing or decreasing the speed of all the propellers simultaneously can result in UAV 100 increasing or decreasing its altitude, respectively. The UAV 100 may also include components for sensing the environment around the UAV 100, including but not limited to audio sensor 122 and audio sensor 114. Further examples of sensor devices are illustrated in FIG. 3 and described below.

Many variations on the illustrated fixed-wing aerial vehicle are possible. For instance, aerial vehicles with more wings (e.g., an "x-wing" configuration with four wings), are also possible. Although FIG. 1 and FIG. 2 illustrate one wing assembly 124, two boom assemblies 106, two horizontal propulsion units 112, and six vertical propulsion units 108 per boom assembly 106, it should be appreciated that other variants of UAV 100 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Some embodiments of the present disclosure are designed to work with the hybrid small aerial vehicle illustrated in FIG. 1 and FIG. 2. In the UAV 100, an array of 12 vertical propulsion units 108 provide thrust for hovering flight. Two horizontal propulsion units 112, two ailerons 110, and two rudders 104 are used primarily for cruise flight. This hybrid configuration makes the task of building an accurate model of the system more challenging, as the aerodynamic interactions are more complex than on larger fixed-wing aircraft (e.g. rotor cross-flow, flow around small structures, etc.). As an alternative to pushing the boundary of computational fluid dynamics tools, or performing complex and expensive measurement campaigns using wind tunnels, learning models from raw flight data as described below turns out to be surprisingly effective. Trained on among the largest scale real-world delivery drone data reported to date, the anomaly detection techniques described herein successfully flag missions with disabled actuators, off-nominal hardware conditions, turbulence and other anomalous events. The approach described herein is based on a combination of non-parametric dynamics modeling and a novel algorithm for robust and scalable least trimmed squares estimation, which may be of independent interest.

FIG. 3 is a block diagram that illustrates a non-limiting example embodiment of an autonomous vehicle 300 according to various aspects of the present disclosure. In some embodiments, the autonomous vehicle 300 is configured to collect telemetry data and transmit the collected telemetry data to an anomaly detection system. In some embodiments, the autonomous vehicle 300 is configured to receive commands from the anomaly detection system in the event of an anomaly being detected, and to take appropriate action to address the anomaly. In some embodiments, the autonomous vehicle 300 is an aircraft. In other embodiments, any other type of autonomous vehicle 300 capable of navigating along a route, such as a wheeled vehicle, may be used. The UAV 100 illustrated in FIG. 1 and FIG. 2 is a non-limiting example embodiment of an autonomous vehicle 300. In some embodiments, the autonomous vehicle 300 may be a different type of autonomous vehicle.

As shown, the autonomous vehicle 300 includes a communication interface 302, one or more vehicle state sensor device(s) 304, a power supply 306, one or more processor(s) 308, one or more propulsion 310, and a computer-readable medium 312.

In some embodiments, the communication interface 302 includes hardware and software to enable any suitable communication technology for communicating with an anomaly detection system. In some embodiments, the communication interface 302 includes multiple communication interfaces, each for use in appropriate circumstances. For example, the communication interface 302 may include a long-range wireless interface such as a 4G or LTE interface, or any other type of long-range wireless interface (e.g., 2G, 3G, 5G, or WiMAX), to be used to communicate with the anomaly detection system while traversing a route. The communication interface 302 may also include a medium-range wireless interface such as a Wi-Fi interface to be used when the autonomous vehicle 300 is at an area near a start location or an endpoint where Wi-Fi coverage is available. The communication interface 302 may also include a short-range wireless interface such as a Bluetooth interface to be used when the autonomous vehicle 300 is in a maintenance location or is otherwise stationary and waiting to be assigned a route. The communication interface 302 may also include a wired interface, such as an Ethernet interface or a USB interface, which may also be used when the autonomous vehicle 300 is in a maintenance location or is otherwise stationary and waiting to be assigned a route. In some embodiments, the communication interface 302 may support transfer of a removable computer-readable medium between the autonomous vehicle 300 and the anomaly detection system to provide the transfer of information between the systems.

In some embodiments, the power supply 306 may be any suitable device or system for storing and/or generating power. Some non-limiting examples of a power supply 306 include one or more batteries, one or more solar panels, a fuel tank, and combinations thereof. In some embodiments, the propulsion 310 may include any suitable devices for causing the autonomous vehicle 300 to travel along the path. For an aircraft, the propulsion 310 may include devices such as, but not limited to, horizontal propulsion units 112, vertical propulsion units 108, and/or one or more flight control surfaces such as ailerons 110 and/or rudders 104. For a wheeled vehicle, the propulsion 310 may include devices such as, but not limited to, one or more motors, one or more wheels, and one or more steering mechanisms.

In some embodiments, the vehicle state sensor device(s) 304 are configured to detect states of various components of the autonomous vehicle 300, and to transmit signals representing those states to other components of the autonomous vehicle 300. Some non-limiting examples of vehicle state sensor device(s) 304 include a battery state sensor, a sensor that reports positions or states of propulsion 310, a sensor that reports the state of a servo for moving a control surface, an inertial sensor, an attitude sensor, a velocity sensor, and a positioning sensor (such as a global navigation satellite system (GNSS) sensor).

In some embodiments, the processor(s) 308 may include any type of computer processor capable of receiving signals from other components of the autonomous vehicle 300 and executing instructions stored on the computer-readable medium 312. In some embodiments, the computer-readable medium 312 may include one or more devices capable of storing information for access by the processor(s) 308. In some embodiments, the computer-readable medium 312 may include one or more of a hard drive, a flash drive, an EEPROM, and combinations thereof.

As shown, the computer-readable medium 312 has stored thereon a telemetry data store 314, a telemetry collection engine 316, and a telemetry communication engine 318. In some embodiments, the telemetry collection engine 316 is configured to receive information from the components of the autonomous vehicle 300, and to store the information in the telemetry data store 314. In some embodiments, the telemetry communication engine 318 is configured to transmit information from the telemetry data store 314 to an anomaly detection system. In some embodiments, the telemetry communication engine 318 may also be configured to receive notifications of detected anomalies from the anomaly detection system, and may help control the autonomous vehicle 300 to respond to the detected anomalies.

In some embodiments, the autonomous vehicle 300 may include components that are not illustrated in FIG. 3, but that one would understand are present. For example, the autonomous vehicle 300 may include one or more wired or wireless communication interfaces that allow the illustrated components of the autonomous vehicle 300 to communicate with each other, including but not limited to an Ethernet network, a USB network, a Bluetooth network, or a CANBUS network.

FIG. 4-FIG. 6 include several charts that illustrate non-limiting example embodiments of telemetry information collected by an autonomous vehicle according to various aspects of the present disclosure. The charts in FIG. 4-FIG. 6 illustrate telemetry information collected by vehicle state sensor device(s) 304 of an autonomous vehicle 300. For each line in each chart, the telemetry information may be provided as a time series of values generated for the given characteristic. In some embodiments, a group of multiple time series such as the illustrated time series may be collected to create a time series data record for a given time period.

On the top of FIG. 4, FIG. 5, and FIG. 6, charts are included that illustrate vertical propulsion unit 108 speed, horizontal propulsion unit 112 speed, and control surface servo positions, respectively. The charts include separate lines for separate devices (e.g., the left chart for vertical propulsion unit 108 speed includes one line for each of four vertical propulsion units 108, the middle chart for horizontal propulsion unit 112 speed includes one line for each of two horizontal propulsion units 112, and the right chart for control surface servo position includes one line each for servos for a left rudder 104, a right rudder 104, a left aileron 110, and a right aileron 110). The propulsion unit speeds and servo positions may be reported by vehicle state sensor device(s) 304 coupled to the propulsion units and servos, by the propulsion units and servos themselves, or by any other suitable technique.

On the bottom of FIG. 4, FIG. 5, and FIG. 6, charts are included that illustrate linear velocity of the autonomous vehicle 300, attitude or orientation of the autonomous vehicle 300, and angular velocity of the autonomous vehicle 300, respectively. These values may be generated via any suitable technique, including but not limited to from a positioning sensor such as a GNSS sensor and/or a motion sensor such as an inertial measurement unit (IMU).

Figure 7:
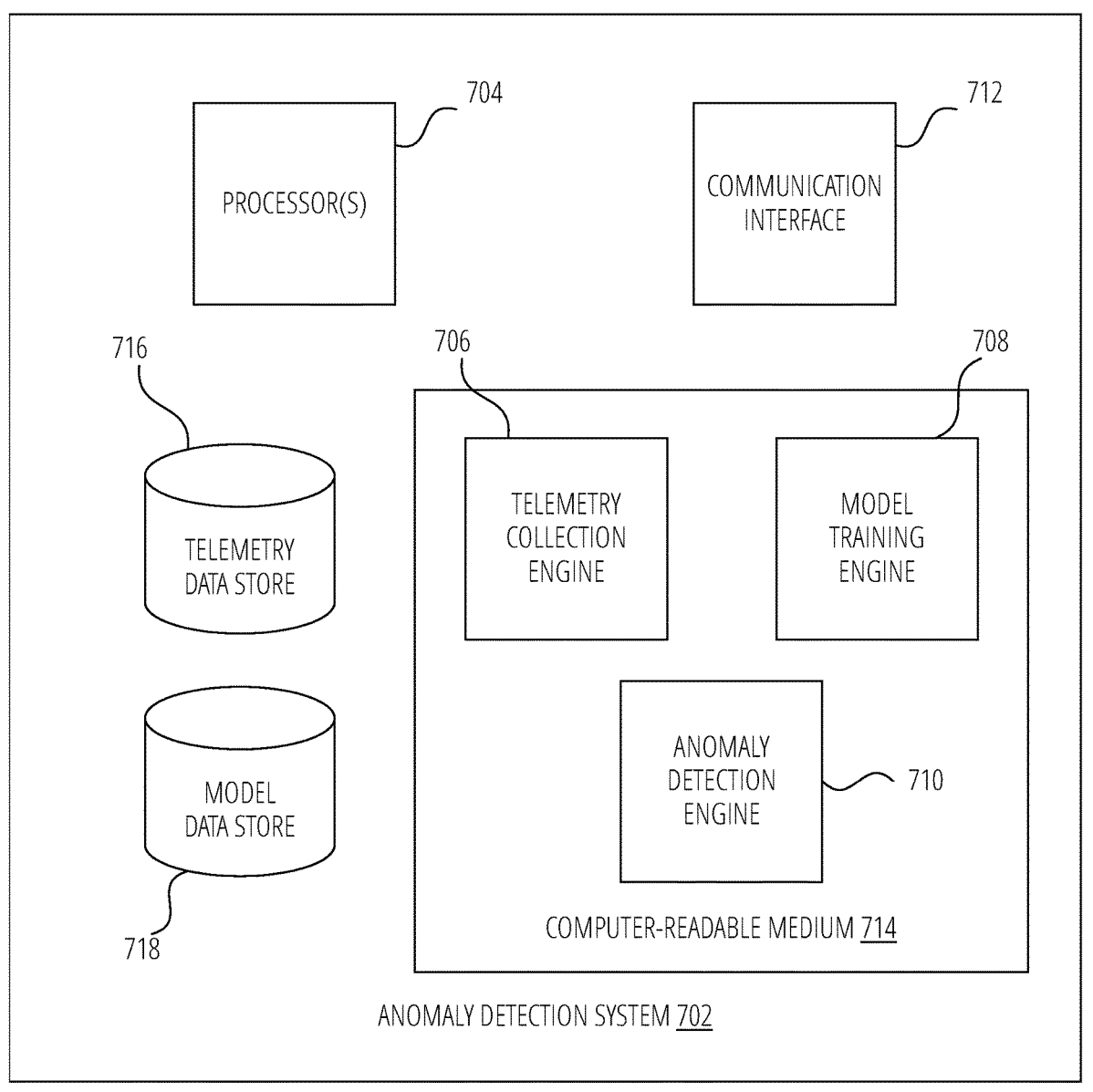
FIG. 7 is a block diagram that illustrates a non-limiting example embodiment of an anomaly detection system according to various aspects of the present disclosure.

FIG. 7 is a block diagram that illustrates a non-limiting example embodiment of an anomaly detection system according to various aspects of the present disclosure. The anomaly detection system 702 may be implemented by any suitable collection of one or more computing devices, each of which may be a desktop computing device, a server computing device, a laptop computing device, a tablet computing device, a mobile computing device, a smartphone computing device, or a computing device in a cloud computing system. In some embodiments, the functionality of the anomaly detection system 702 may be separated between multiple computing devices. In some embodiments, some components illustrated as being present in the anomaly detection system 702 may be present in the autonomous vehicle 300. For example, in some embodiments, the anomaly detection engine 718 may be present within the autonomous vehicle 300 instead of within a separate anomaly detection system 702.

As shown, the anomaly detection system 702 includes one or more processor(s) 704, a communication interface 706, and a computer-readable medium 708.

In some embodiments, the processor(s) 704 In some embodiments, the processor(s) 704 may include one or more commercially available general-purpose computer processors, each of which may include one or more processing cores. In some embodiments, the processor(s) 704 may also include one or more special-purpose computer processors, including but not limited to one or more processors adapted for efficiently performing machine learning tasks.

In some embodiments, the communication interface 706 provides any suitable communication technology for communicating with the communication interface 302 of the autonomous vehicle 300 as described above, including but not limited to wired technologies, wireless technologies, removable media technologies, and/or combinations thereof as described above.

As shown, the computer-readable medium 708 includes logic stored thereon that, in response to execution by the processor(s) 704, causes the computer-readable medium 708 to provide a telemetry collection engine 716, a model training engine 714, and an anomaly detection engine 718. In some embodiments, the telemetry collection engine 716 is configured to receive time series data records that include telemetry information from autonomous vehicles and to store the time series data records in the telemetry data store 710. In some embodiments, the model training engine 714 is configured to use the time series data records stored in the telemetry data store 710 to train a machine learning model to determine vehicle flight dynamics, discard anomalous data from a training set, and to detect anomalies based on the determined vehicle flight dynamics. In some embodiments, the anomaly detection engine 718 is configured to use the machine learning model trained by the model training engine 714. Further description of the actions performed by each of these components is provided below.

As used herein, "engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As shown, the anomaly detection system 702 also includes a telemetry data store 710 and a model data store 712. In some embodiments, the telemetry data store 710 stores time series data records that include telemetry information collected by the telemetry collection engine 716. In some embodiments, the model data store 712 stores machine learning model trained by the model training engine 714.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 9:
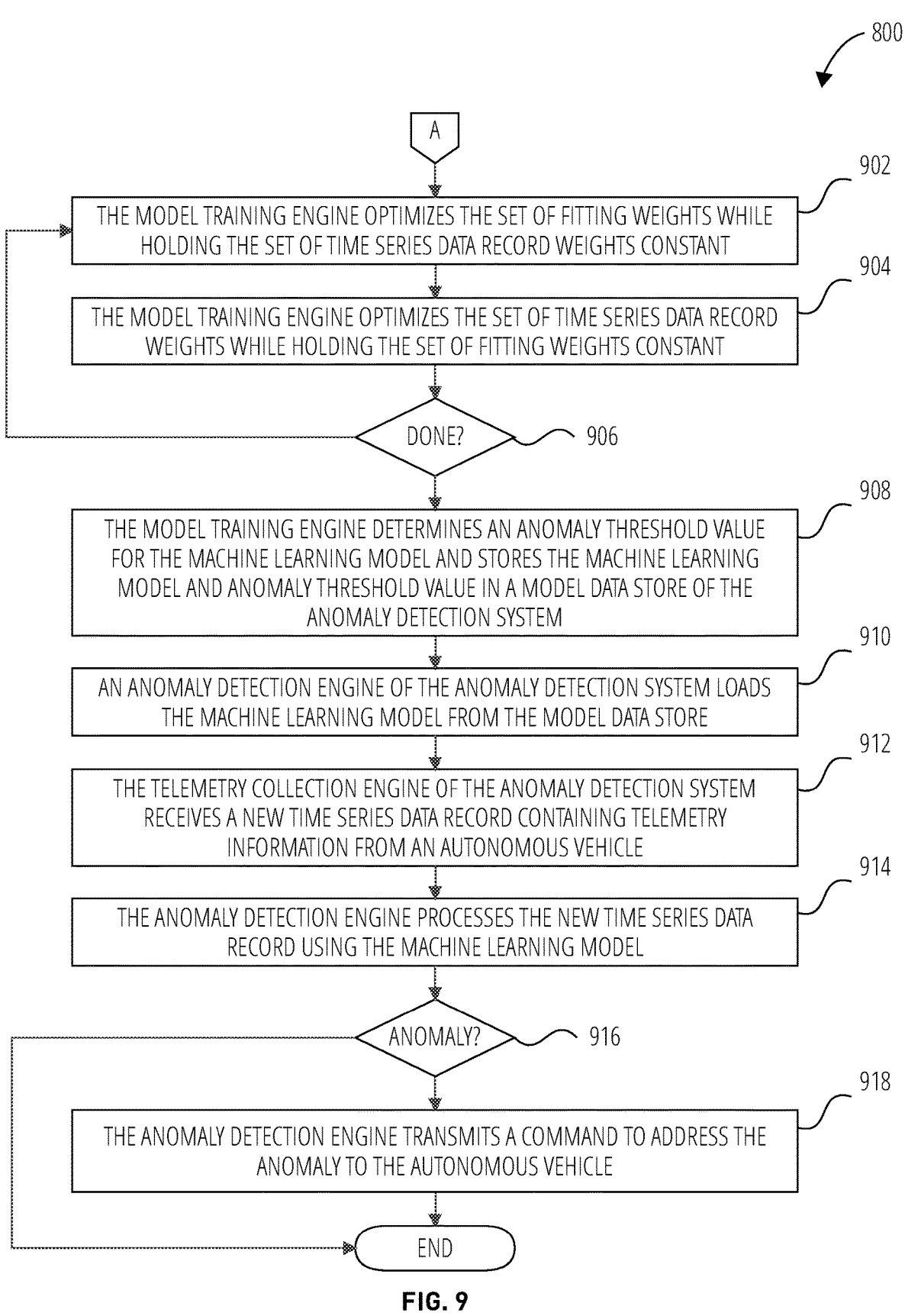

FIG. 8 and FIG. 9 are a flowchart that illustrates a non-limiting example embodiment of a method of detecting anomalies in telemetry information according to various aspects of the present disclosure. The illustrated method 800 shows both training and using the machine learning model. However, in some embodiments, the method 800 might only train or might only use the machine learning model. Further, the method 800 as illustrated describes time series data records that include telemetry information from trips or missions of a UAV 100. These should not be seen as limiting, and in some embodiments, any other type of information may be stored in time series data records and processed by the method 800 to train a machine learning model and/or detect anomalies using the machine learning model.

From a start block, the method 800 proceeds to block 802, where, for a plurality of autonomous vehicles, a telemetry collection engine 316 of each autonomous vehicle 300 receives telemetry information during a trip from one or more vehicle state sensor device(s) 304 of the autonomous vehicle 300. A trip (sometimes referred to as a "flight" or "mission") describes an action taken by the autonomous vehicle 300, and typically includes one or more of a takeoff portion, a package pickup portion, a cruise portion, a package delivery portion, and a landing portion.

At block 804, for each autonomous vehicle 300 of the plurality of autonomous vehicles, the telemetry collection engine 316 of each respective autonomous vehicle 300 stores the telemetry information for the trip in a telemetry data store 314 of the autonomous vehicle 300. In some embodiments, the telemetry collection engine 316 may constantly store telemetry information in the telemetry data store 314 as it is generated by the vehicle state sensor device(s) 304. In some embodiments, the telemetry collection engine 316 may collect the telemetry information in temporary storage and store it in the telemetry data store 314 once a trip is complete. In some embodiments, the telemetry collection engine 316 stores time series data records that include separate time series entries for each separate vehicle state sensor device in a single time series data record. In some embodiments, the telemetry collection engine 316 may store separate time series data records for each separate vehicle state sensor device.

At block 806, for the plurality of autonomous vehicles, a telemetry communication engine 318 of each autonomous vehicle 300 transmits a time series data record for each trip in its telemetry data store 314 that includes the telemetry information for the trip to a telemetry collection engine 716 of an anomaly detection system 702. In some embodiments, the autonomous vehicle 300 may transmit multiple time series data records for each trip, particularly if separate time series data records are stored for each vehicle state sensor device. In some embodiments, the telemetry communication engine 318 may continually transmit the time series data record to the telemetry collection engine 716 as long as the autonomous vehicle 300 is communicatively connected to the anomaly detection system 702. In some embodiments, the telemetry communication engine 318 may transmit the time series data record once the trip is completed.

At block 808, the telemetry collection engine 716 of the anomaly detection system 702 stores the time series data records in a telemetry data store 710 of the anomaly detection system 702. By storing the time series data records in the telemetry data store 710, a large set of time series data records may be collected for model training purposes. It is worth nothing that the time series data records need not be tagged as normal or anomalous, as the remainder of the method 800 will automatically detect the anomalous time series data records in the training data and treat them appropriately.

At block 810, a model training engine 714 of the anomaly detection system 702 initializes a machine learning model having a set of fitting weights and a set of time series data record weights. The anomaly detection system 702 may be configured to train and use any suitable type of machine learning model for detecting anomalies. A description of a non-limiting example of a machine learning model suitable for use with anomaly detection system 702 that has a set of fitting weights and a set of time series data record weights follows.

Consider an autonomous vehicle interacting with its environment according to an unknown continuous-time nonlinear dynamical system, $$\dot{x}(t) = f(x(t), u(t))$$

where states $x(t) \in \mathbb{R}^n$ and controls $u(t) \in \mathbb{R}^m$. Assume that a fleet of such autonomous vehicles collectively and continuously execute missions generating trajectory logs of the form, $$\tau_i = \{(x_i(t), u_i(t), \dot{x}_i(t))\}_{t=0}^{T_i}$$

where i indexes the mission.

From N mission logs, one may naturally hope to learn f over a suitable family of function approximators $\mathscr{F}$ by solving a least squares problem, $$f^* = \arg \min_{f \in \mathscr{F}} \sum_{i=1}^{N} r(\tau_i, f)$$

where r denotes the predictive residual, $$r(\tau, f) = \frac{1}{T}\sum_{t=1}^{T}\|\dot{x}(t) - f(x(t), u(t))\|_2^2$$

While this is reminiscent of model-based Reinforcement Learning, our interest in the present disclosure is not to learn controllers, but rather to turn the dynamics estimate f* into a detector that can flag mission abnormalities. For any trajectory τ generated by a new mission, the per time-step residual norm $$\|\dot{x}(t){-}f^*(x(t), u(t))\|_2^2$$

is a measure of "instantaneous unexpectedness" and the mean residual across time, r(Δ, f*), defines an anomaly score for that mission.

Chu et. al. adopt this approach for predicting linear and angular acceleration of the aircraft. By using linear and quadratic functions, a single pass over the mission logs suffices for least squares estimation. In practice, such an approach to anomaly detection may become fragile in the face of the quality of real world data. When the set of training missions is contaminated with operational failures or carry subtle signatures of future catastrophes (e.g., sensor degradation), the detector may extract a misleading characterization of normal behavior. Unlike model-based RL settings where all collected trajectories may be useful for learning the unknown dynamics, for anomaly detection the learning process has to simultaneously filter out missions for such abnormalities while fitting a model to the data that remains. In the absence of such a filtering mechanism, ordinary least squares estimators and associated anomaly detectors may degrade in quality due to the presence of highly abnormal missions in the training set.

A measure of robustness of an estimator is the finite-sample breakdown point which in the present context is the fraction of mission trajectories that may be arbitrarily corrupted so as to cause the parameters of the estimator to blowup (i.e., become infinite). For least squares estimators or even least absolute deviations ($l_1$) regressors, the finite sample breakdown point is $$\frac{1}{N}$$

making them fragile in the presence of heavy outliers in the training set. A more robust alternative is trimmed estimators. For any f, denote the order statistics of the residuals as, $$r(\tau_{[1]}, f){\leq}r(\tau_{[2]}, f){\leq} \ldots {\leq}r(\tau_{[N]}, f)$$

Then we define the trimmed estimator as the sum of the smallest k residuals, $$f^* = \arg\min_{f,\mathscr{F}}\sum_{i=1}^{k}r(\tau_{[i]}, f)$$

The breakdown point of such an estimator is $$\frac{N - k + 1}{N}$$

where k is the number of missions that should not be trimmed. In practice, k is unknown and is treated as a hyper-parameter. By making k small enough, the breakdown point can even be made larger than 50%.

The price of strong robustness is computational complexity of least trimmed squares estimation: for an exact solution, the complexity scales as $$O(N^{d+1})$$

for d≥3 dimensional regression problems. The optimization task is both non-smooth and non-convex. Due to its combinatorial flavor, it is not amenable to standard gradient techniques or least squares solvers even for linear models. Thus, the development of practical approximate algorithms is of significant interest. The present disclosure provides a novel algorithm for robust learning based on smoothing the trimmed squares loss. The algorithm is inspired by Nesterov's smoothing procedure for minimizing non-smooth objective functions, and is also closely related to Deterministic Annealing methods for combinatorial optimization.

Consider the function that maps a vector r∈ $\mathbb{R}^N$ to the sum of its k smallest elements, $$h_k(r) = \sum_{i=1}^{k}r_{[i]}, \text{ where } r_{[1]} \leq r_{[2]} \leq \ldots \leq r_{[N]}$$

This function admits a smoothing defined as follows.

$$h_k^T(r) = \min_{\alpha\in\mathbb{R}^N}\alpha^T r + T\sum_{i=1}^{N}H(\alpha_i)$$

$$\text{s.t.}:\sum_{i=1}^{N}\alpha_i = k, 0 \leq \alpha_i \leq 1$$

$$\text{where } H(u) = u \log (u) + (1-u) \log (1-u)$$

Above, T is a smoothing parameter also referred to as the "temperature" in the annealing literature. Intuitively, if $\alpha_i$ tends to zero, the corresponding mission is considered too anomalous for training and is trimmed away. The α's may also be interpreted as probability distributions over binary indicator variables encoding whether or not to trim a mission. As such, when T is high, the smoothed objective is dominated by the entropy of the α's and tend to approach the uniform distribution $$\forall i : \alpha_i = \frac{k}{N}.$$

As T→0, the weights harden towards binary values. This strategy of starting with a highly smoothed proxy to a non-convex non-smooth function and gradually increasing the degree of convexity is the central idea of homotopy, continuation and graduated non-convexity methods for global optimization. In the ideal case, the highly smoothed function is close to being convex allowing the global minimum to be found efficiently. As smoothing is reduced, one hopes that following the continuous path of the minimizer would lead to the global minimum.

Spurious local minima can be eliminated due to smoothing, making the optimization task much easier. In particular, the smoothing discussed above has the following properties :

$h_k^T$ is a concave function.

$h_k^T$ is continuously differentiable.

$h_k^T(r){-}TR{\leq}h_k(r){\leq}h_k^T(r)$ holds for some fixed constant R.

With this smoothing of the trimmed loss, for a fixed number of k missions to retain, we consider the following optimization problem, $$f^* = \arg\min_{f_0,\#}\sum_{i=1}^{k} h_k^T(r(f)),\ r(f) = [r(\tau_{1,}f)...r(\tau_N,\ f)]$$

Equivalently, $$f^* = \arg\min_{f,\mathcal{F},\alpha\in\mathbb{R}^r}\sum_{i=1}^{N}\alpha_i r(\tau_i,\ f) + TH(\alpha_i)$$

such that:

$$\sum_{i=1}^{N}\alpha_i = k,\ 0 \le a_i \le 1.$$

The method 800 then advances to a continuation terminal ("terminal A"). From terminal A (FIG. 9), the method 800 proceeds to block 902 and block 904. These blocks represent a fitting phase and a trimming phase, and the method 800 alternates between them until convergence. Both of these phases are fast, efficient, and easily scale to thousands of missions and millions of measurements. The optimization may be initialized with $$\alpha = \frac{k}{N}$$

which corresponds to the non-robust least squares estimator and the limit of $T\to\infty$. This may be part of the initialization of the machine learning model performed in block 810.

At block 902, the model training engine 714 optimizes the set of fitting weights while holding the set of time series data record weights constant. In some embodiments, this optimization may be performed a predetermined number of times before advancing to block 904. In some embodiments, this optimization may be performed until a loss function that measures performance converges to a minimum value before advancing to block 904.

In designing the machine learning model, we consider linear combinations of fixed nonlinear basis functions, $$f(x,\ u)=W\phi(x,\ u)$$

where $$\phi: \mathbb{R}^{n+m}\ \mathbb{R}\mapsto d$$

is a nonlinear feature map and W is a n×d parameter matrix.

For fixed $\alpha$'s, optimizing W is a weighted least squares problem which admits a fast single pass solution, $$W=[A+\lambda I_d]^{-1}B$$

where:

$$A=\Sigma_{i=1}^{N}\alpha_i\Sigma_t\phi(x_i(t),\ u_i(t))\phi(x_i(t),\ u_i(t))^T$$

$$B=\Sigma_{i=1}^{N}\alpha_i\Sigma_t\phi(x_i(t),\ u_i(t))\dot{x}_i(t)^T$$

At block 904, the model training engine 714 optimizes the set of time series data record weights while holding the set of fitting weights constant. In some embodiments, this optimization may be performed a predetermined number of times before advancing to decision block 906. In some embodiments, this optimization may be performed until a loss function that measures performance converges to a minimum value before advancing to decision block 906.

For fixed W, we compute the vector of N residuals given by $r_i=r(\tau_i,\ W)$. The $\alpha$optimization takes the form:

$$\alpha_i = \frac{1}{1 + \exp\left(\frac{r_i - v}{T}\right)}$$

where the scalar v satisfies the nonlinear equation, $$\psi(v) = \sum_{i=1}^{N}\frac{1}{1 + \exp\left(\frac{r_i - v}{T}\right)} - k = 0$$

The root of this equation can be easily solved e.g., via the bisection method noting that $\psi(\alpha)<0$ for $$a = \min_i r_i - T\ \log\left(\frac{N - k}{N}\right)$$

and $\psi(b)>0$ for $$b = \max_i r_i - T\ \log\left(\frac{N - k}{N}\right)$$

provides an initial bracketing of the root.

We experimented with both linear models as well as nonlinear random basis functions of the form, $$\phi(x,\ u) = \sqrt{\frac{2}{d}}\ \cos\ \left(\sigma^{-1}Gx + \sigma^{-1}Hu + b\right)$$

where $$G_{ij},\ H_{ij}\sim\mathcal{N}(0,\ 1),\ b\sim\mathcal{U}(0,\ 2\pi)$$

and $$G\in\mathbb{R}^{d\times n},\ H\in\mathbb{R}^{d\times m}.$$

Here, the feature map dimensionality d controls the capacity of the dynamics model. In particular, as $d\to\infty$, inner products in the random feature space approximate the Gaussian Kernel, $$\phi(x,\ u)^T\phi(\bar{x},\ \bar{u}) \approx e^{-\frac{\|x-\bar{x}\|_2^2+\|u-\bar{u}\|_2^2}{2\sigma^2}}$$

The implication of this approximation is that each component of the learnt dynamics function is a linear combination of similarity to training mission measurements, in the following sense $$f_j(x,\ u) = w_j^T\phi(x,\ u) \approx \sum_{i=1}^{N}\sum_t\beta_{j,i,t}e^{-\frac{\|x-x_i(t)\|_2^2+\|u-u_i(t)\|_2^2}{2\sigma^2}}$$

for some coefficients $\beta_{j,i,r}$ and where $w_j^T$ refers to the i-th row of W.

The random feature method scales linearly in the number of measurements, as opposed to cubically for $\beta$ when working with exact kernels. At the price of losing this linear training complexity and globally optimal solution, one may also embrace deep networks for this application to parameterize the dynamics model.

The method 800 then proceeds to decision block 906, where a determination is made regarding whether optimization of the machine learning model is complete. In some embodiments, the determination may be based on whether a loss function that measures performance of the machine learning model has converged to a minimum value. In some embodiments, the determination may be made based on whether a predetermined number of iterations has been completed.

If optimization of the machine learning model is not yet complete, then the result of decision block 906 is NO, and the method 800 returns to block 902 to further iterate on the weights. Otherwise, if optimization of the machine learning model is complete, then the result of decision block 906 is YES, and the method 800 advances to block 908.

At block 908, the model training engine 714 determines an anomaly threshold value for the machine learning model and stores the machine learning model and the anomaly threshold value in a model data store 712 of the anomaly detection system 702. The machine learning model is stored in the model data store 712 so that it can be distributed to other devices to perform anomaly detection without having to newly train a machine learning model. In some embodiments, the anomaly threshold value may be determined by trading off precision and recall. The receiver operating characteristic (ROC) curve may be plotted for the training data, and a desired true positive rate may be used to determine the anomaly threshold value. Having a high true positive rate generally comes at the expense of a higher false negative rate (false alarms), and a good regime is determined using the ROC curve.

At block 910, an anomaly detection engine 718 of the anomaly detection system 702 loads the machine learning model from the model data store 712. In some embodiments, the anomaly detection system 702 may be a different anomaly detection system 702 than an anomaly detection system 702 that originally trained the machine learning model and stored the machine learning model in the model data store 712.

At block 912, the telemetry collection engine 716 of the anomaly detection system 702 receives a new time series data record containing telemetry information from an autonomous vehicle 300. In some embodiments, the new time series data record may represent an entire trip, or may represent a portion of a trip. In some embodiments, the new time series data record may be transmitted during the trip by the autonomous vehicle 300 so that anomalies can be detected in real-time.

At block 914, the anomaly detection engine 718 processes the new time series data record using the machine learning model. In some embodiments, the machine learning model takes the new time series data record as input and outputs an anomaly score, which is compared to the anomaly threshold value.

The method 800 then advances to a decision block 916, where a determination is made regarding whether an anomaly has been detected. In some embodiments, the anomaly is detected when the anomaly score is greater than or equal to the anomaly threshold value.

If an anomaly has not been detected, then the method 800 proceeds to an end block and terminates. If an anomaly has been detected, then the result of decision block 916 is YES, and the method 800 advances to block 918, where the anomaly detection engine 718 transmits a command to address the anomaly to the autonomous vehicle 300. Any suitable command may be transmitted. For example, in some embodiments, the anomaly detection engine 718 may determine an action to be taken in response to the anomaly, and may transmit a command to the autonomous vehicle 300 to cause the autonomous vehicle 300 to perform the action to address the anomaly. In some embodiments, the action may be at least one of rescheduling a future trip, navigating to an emergency repair location, and immediately performing a landing procedure. In some embodiments, the action may include accepting remote control from a human operator to address the anomaly. The method 800 then proceeds to an end block and terminates. The method 800 is shown as terminating at this point for the sake of clarity. In some embodiments, the method 800 may instead return to block 914 to check further time series data records for anomalies before terminating. $x(t) \in \mathbb{R}^n$ We generated synthetic 8-dimensional input and 3-dimensional output time series following a linear model as follows. The output time series for normal missions carry moderate Gaussian noise, but anomalous missions are heavily corrupted by non-Gaussian noise sampled uniformly from the interval [0,10]. 200 training and 200 test missions, each with 100 time steps were generated with 50% anomalies following the procedure below. The anomaly labels were discarded for training and only used for evaluation.

$$x(t) \in \mathbb{R}^8 = \cos(g * t + b), g, b \in \mathbb{R}^8, g_i, b_i - \mathcal{N}(0, 1)$$

$$y(t) \in \mathbb{R}^3 = Wx(t) + \varepsilon(t), W \in \mathbb{R}^{3 \times 8}$$

$$\varepsilon(t) \in \mathbb{R}^8 := \begin{cases} \varepsilon_i - \mathcal{N}(0, 1) & \text{for normal} \\ \varepsilon_i - \mathcal{U}nif(0, 10) & \text{for anomaly} \end{cases}$$

FIG. 10 includes two charts that illustrate how alternating optimization of the smoothed trimmed loss (with temperature T=1.0) leads to monotonic descent in the sum of the smallest k=100 residuals, a consequence of our smoothing formulation. The optimization converges to a set of mission weights ($\alpha$'s) that clearly trim away nearly all the anomalies present in the training set despite heavy 50% corruption and no explicit anomaly labels provided to the algorithm.

Figure 11:
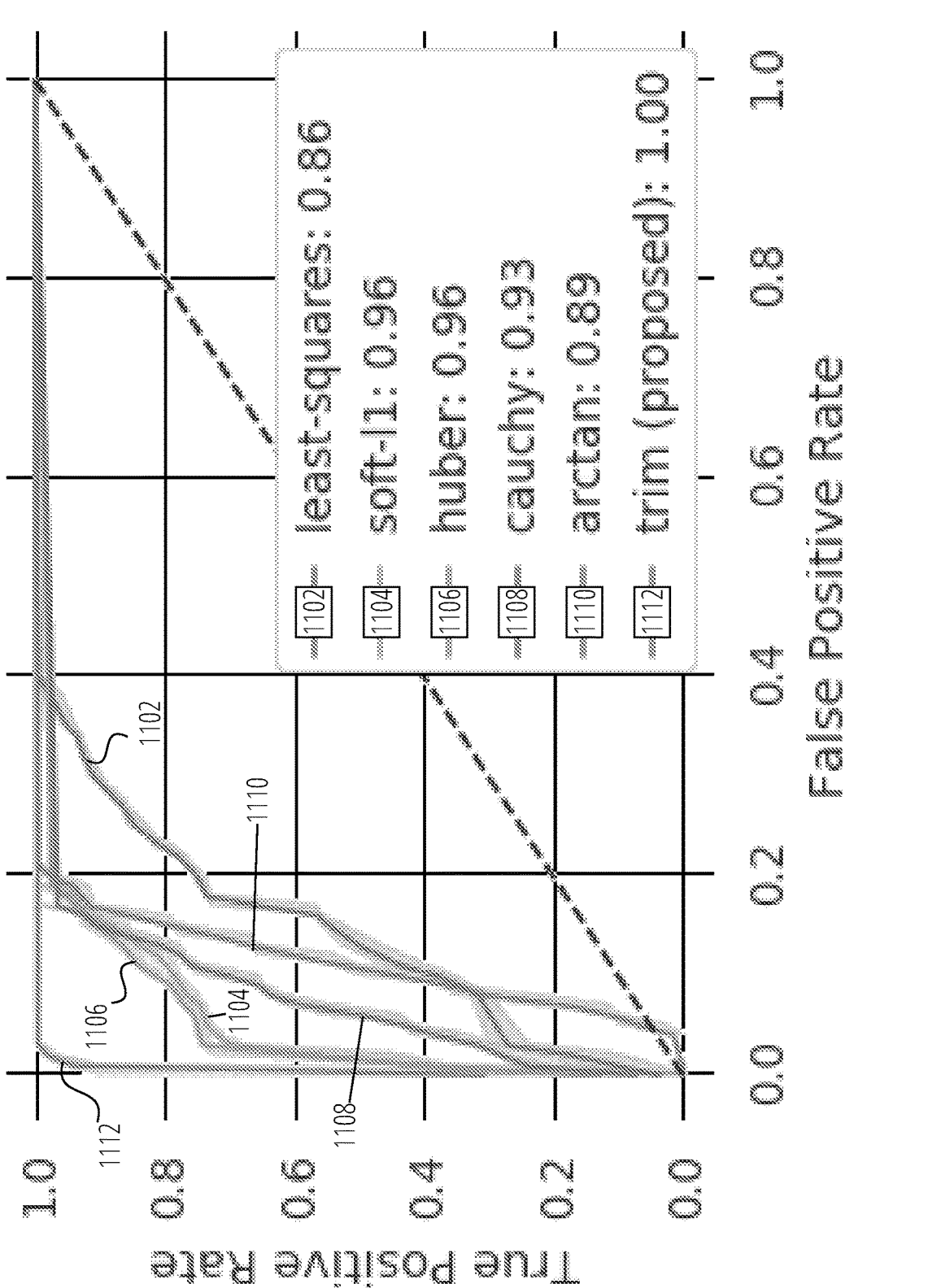
FIG. 11 is a chart that illustrates a comparison of anomaly detectors based on the approach disclosed herein against pure least-squares models and several M-estimators proposed in the Robust Statistics literature.

FIG. 11 is a chart that illustrates a comparison of anomaly detectors based on the approach disclosed herein against pure least-squares models and several M-estimators proposed in the Robust Statistics literature. Due to its non-robustness, the least-squares detector is hurt the most due to corruptions in the training set. By limiting outlier performance, robust loss functions such as $l_1$ and huber show improved performance. Yet, they are outperformed by the proposed trimming approach which gives perfect detection despite massive corruption of the training data.

FIG. 12-FIG. 14 include several charts that illustrate experimental results of using a machine learning model to detect anomalies according to various aspects of the present disclosure. The results relate to data collected from a fleet of delivery drones flying in multiple environments on real delivery flight missions. A typical mission consists of a takeoff, package pickup, a cruise phase to deliver the package, and subsequent landing. To the best of our knowledge, machine learning on real delivery drone data at this scale is unprecedented: 5000 historical missions prior to a cutoff date generating around 80 million measurements are used for training.

Trained detectors were tested on 5000 outdoor missions after the cutoff date. By contrast, recent papers have reported results on 20 to 50 test missions in controlled lab environments. Our large-scale flight log data covers multiple vehicle types, package configurations and variable temperature and wind conditions. Additionally, the mission logs are mixed with a variety of research and development flights that include flight envelope expansion, prototype hardware and software, and other experiments designed to stress-test the flight system. Flight missions generally last approximately 5 minutes including several kilometers of cruise flight.

FIG. 4-FIG. 6, discussed above, show examples for the input signals used for training models to predict linear and angular acceleration of the vehicle. Each input time series is re-scaled so that values lie in the interval [4.0, 1.0]. Training a nonlinear trimmed model with d=100 random Fourier features on 80 million measurements, including data pre-processing, is completed within 1.15 hours on a single CPU. FIG. 12-FIG. 14 each illustrate prediction results from a normal flight (top) and an anomalous flight (bottom). The predictions show a large spike towards the end of the anomalous test mission. This large spike causes the mean residual error to be large, flagging the flight as anomalous.

The vehicle's position, velocity, and attitude estimates from an EKF-based state estimator are compared with commands generated by a high-level mission planning system. The controller generates actuator commands to reduce errors between the state estimate and commands. The controller incorporates a real-time airspeed estimate to properly allocate control between individual hover motors and aerodynamic control surfaces throughout the airspeed envelope.

Figure 15:
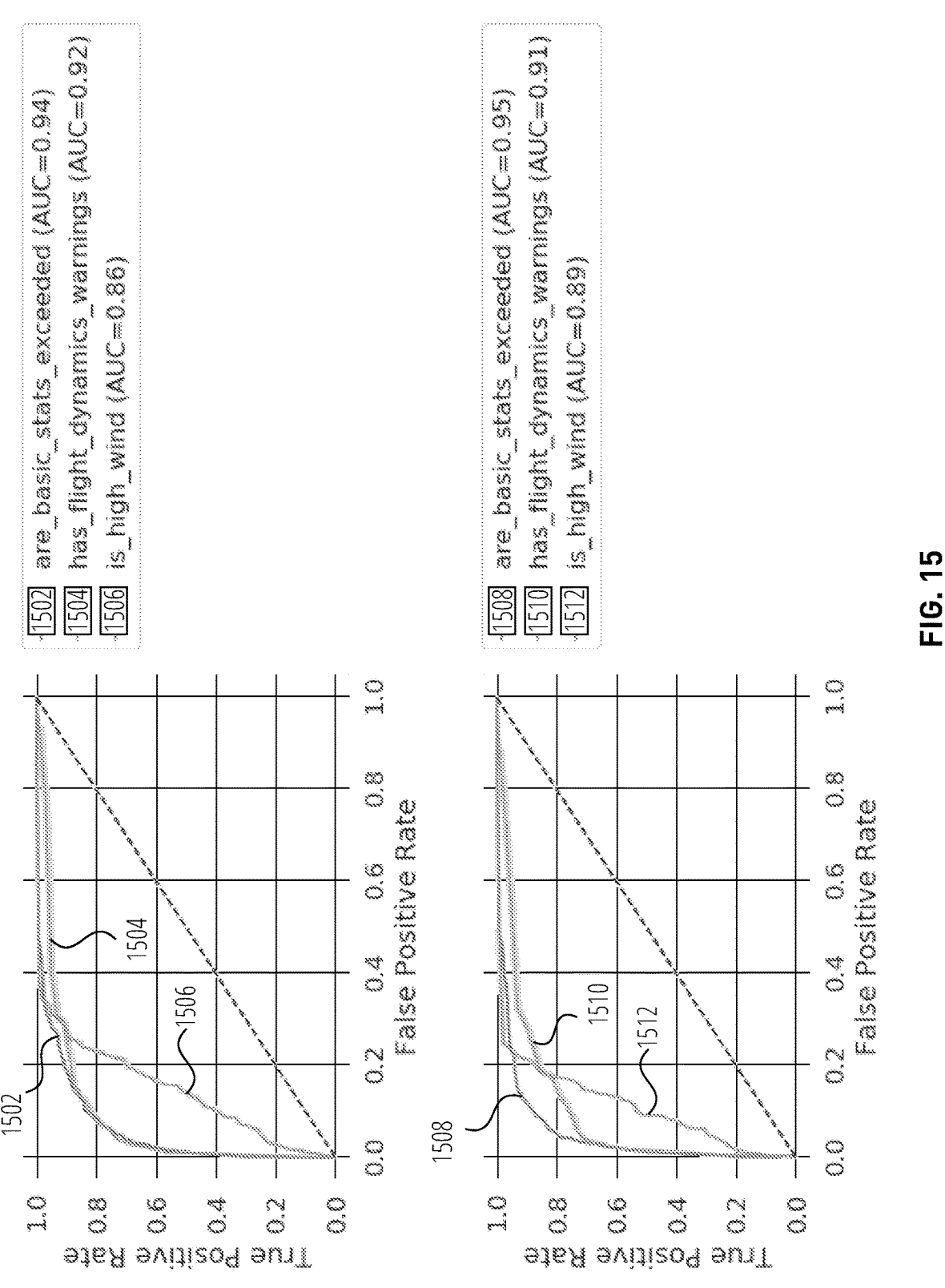
FIG. 15-FIG. 16 include charts that illustrate the performance of various detectors on a test set of 5000 missions according to various aspects of the present disclosure.
Figure 16:
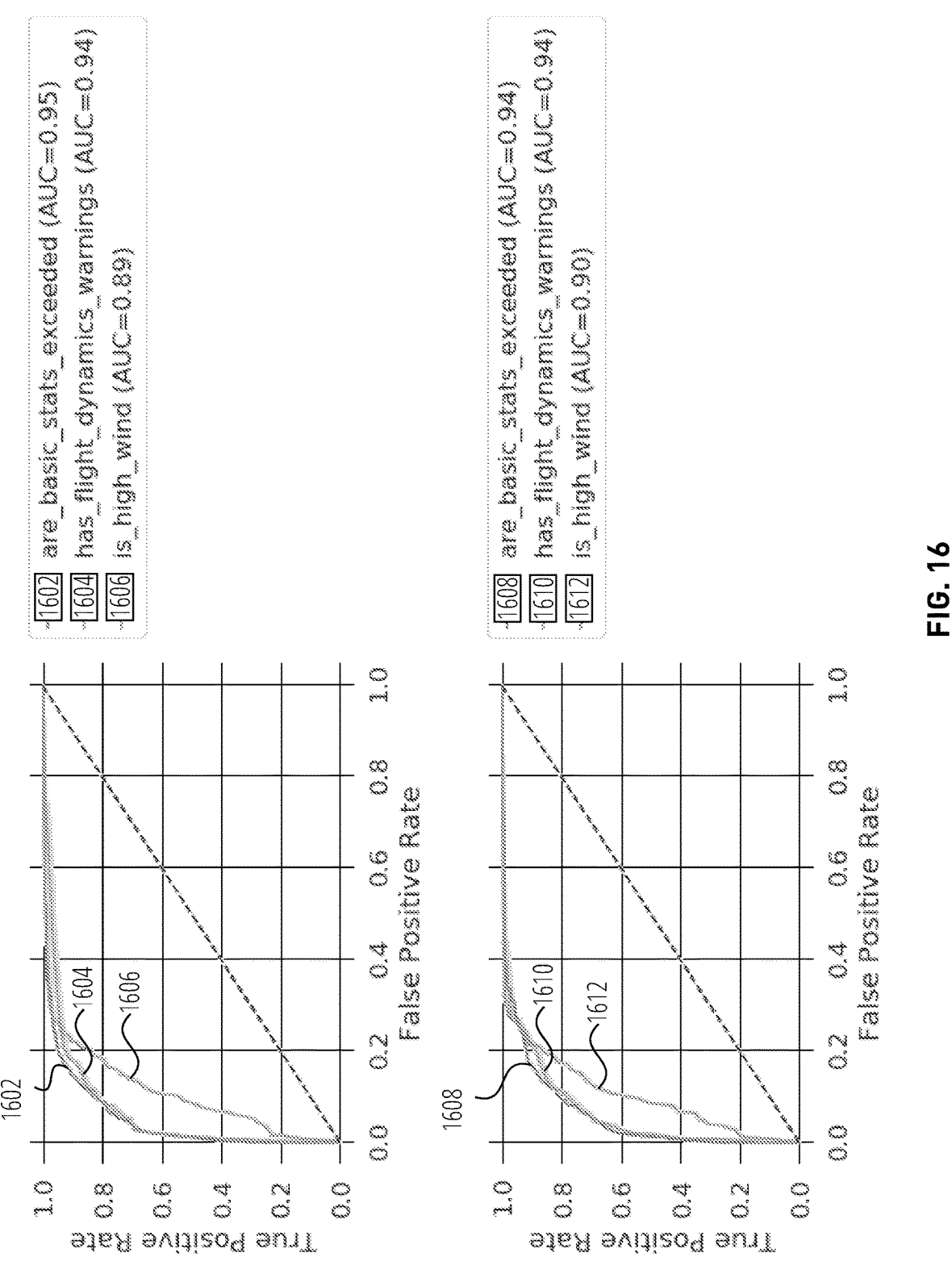

FIG. 15 and FIG. 16 include charts that illustrate the performance of various detectors on the test set of 5000 missions. In FIG. 15, from top to bottom, the charts illustrate a linear model and a linear+trimming model. In FIG. 16, from top to bottom, the charts illustrate a non-linear model and a non-linear plus trimming model.

We report detection rates for multiple anomaly types:

are-basic-stats-exceeded: Basic statistical measures such as velocity command error, error from commanded path, pitch, roll, Root Mean Squared pitch and roll error, pitch and roll torque commands are more than 3 standard deviations from the mean computed over the entire training set.

has-flight-dynamics-issue: The particular flight had an issue where the flight dynamics were off-nominal due to various factors such as an intentionally disabled actuator or other off-nominal airframe modifications to test system robustness.

is-high-wind: The prevailing wind speed is greater than 10 m/s, which qualitatively indicates elevated levels of turbulence.

Approximately 12% of the test set of 5000 missions has these anomalies.

For the non-linear trimmed detectors (d=100, T=1.0, k=0.75 N) on a test set of 5000 missions, the area under the True-Positive-Rate vs. False-Positive-Rate curve exceeds 0.90. The detector coverage goes beyond simple statistical anomaly measures firing reliably across a multitude of factors such as disabled actuators, otherwise off-nominal hardware conditions and the vehicle experiencing turbulent conditions.

Figure 17:
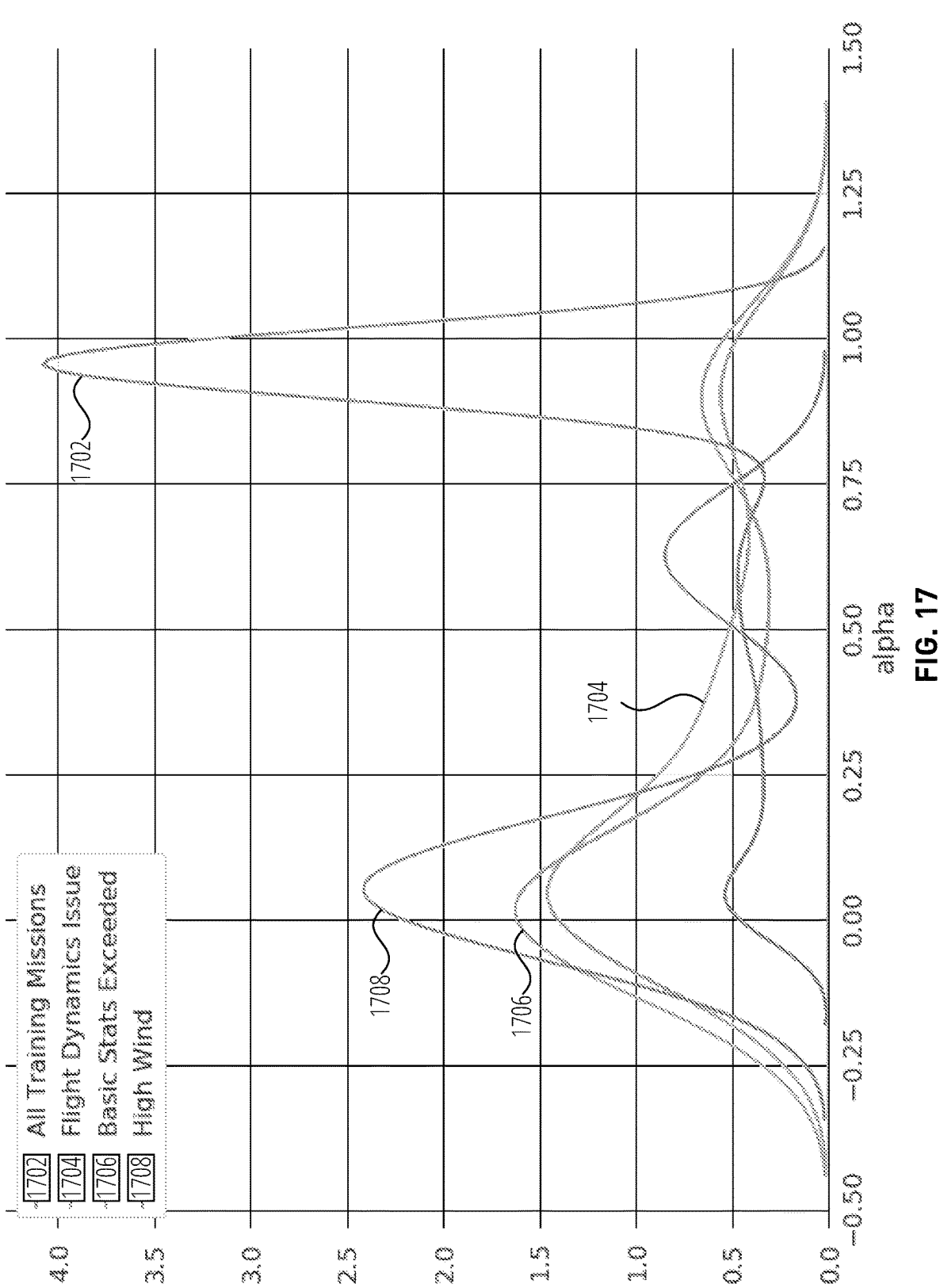
FIG. 17 is a chart that illustrates a smoothed distribution of mission weights learned by an experimental example embodiment of the trimming technique.

FIG. 17 is a chart that illustrates a smoothed distribution of mission weights learned by an experimental example embodiment of the trimming technique. The distribution of $\alpha$'s peaks close to 0 in comparison to the mean over the entire training set which is close to 1.0. This confirms the ability of the proposed method to successfully filter out anomalies from the training set, in order to extract normal flight patterns, without requiring any form of supervision. Without nonlinear modeling and trimming, we observed performance degradation in an analysis across finer anomaly type categories.

Figure 18:
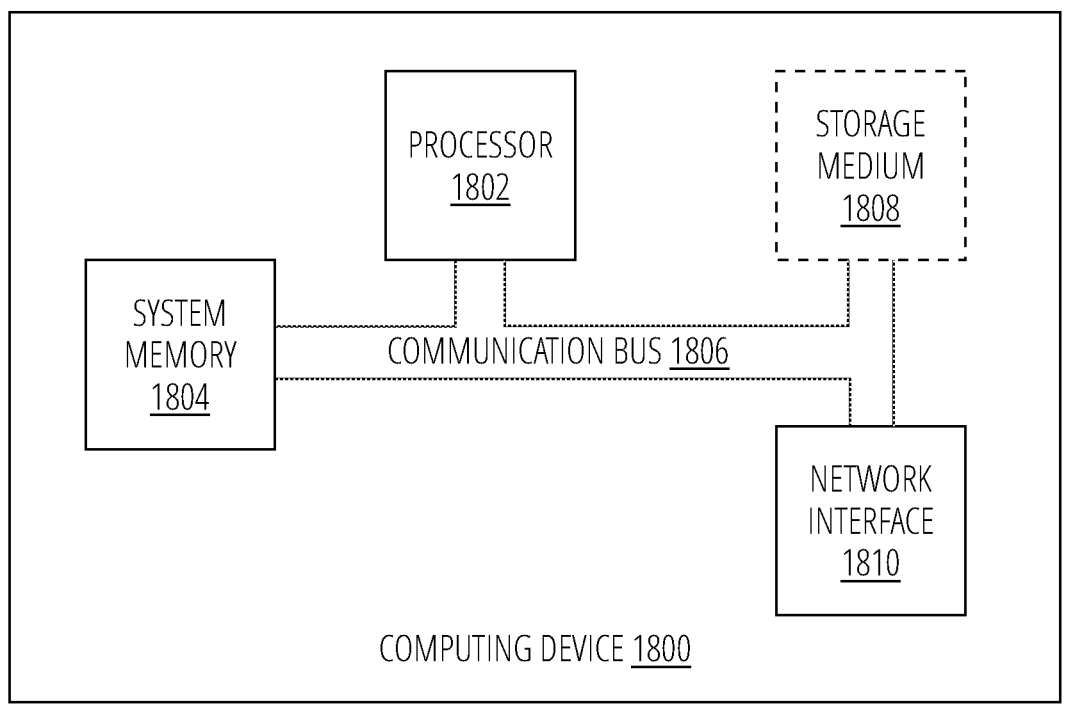
FIG. 18 is a block diagram that illustrates a non-limiting example embodiment of a computing device appropriate for use as a computing device with embodiments of the present disclosure.

FIG. 18 is a block diagram that illustrates aspects of an exemplary computing device 1800 appropriate for use as a computing device of the present disclosure. While multiple different types of computing devices were discussed above, the exemplary computing device 1800 describes various elements that are common to many different types of computing devices. While FIG. 18 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 1800 may be any one of any number of currently available or yet to be developed devices.

In its most basic configuration, the computing device 1800 includes at least one processor 1802 and a system memo 1810 connected by a communication bus 1808. Depending on the exact configuration and type of device, the system memory 1810 may be volatile or nonvolatile memory, such as read only memory ("ROM"), random access memory ("RAM"), EEPROM, flash memory, or similar memory technology. Those of ordinary skill in the art and others will recognize that system memory 1810 typically stores data and/or program modules that are immediately accessible to and/or currently being operated on by the processor 1802. In this regard, the processor 1802 may serve as a computational center of the computing device 1800 by supporting the execution of instructions.

As further illustrated in FIG. 18, the computing device 1800 may include a network interface 1806 comprising one or more components for communicating with other devices over a network. Embodiments of the present disclosure may access basic services that utilize the network interface 1806 to perform communications using common network protocols. The network interface 1806 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 1806 illustrated in FIG. 18 may represent one or more wireless interfaces or physical communication interfaces described and illustrated above with respect to particular components of the computing device 1800.

In the exemplary embodiment depicted in FIG. 18, the computing device 1800 also includes a storage medium 1804. However, services may be accessed using a computing device that does not include means for persisting data to a local storage medium. Therefore, the storage medium 1804 depicted in FIG. 18 is represented with a dashed line to indicate that the storage medium 1804 is optional. In any event, the storage medium 1804 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 1802, system memory 1810, communication bus 1808, storage medium 1804, and network interface 1806 are known and commercially available. For ease of illustration and because it is not important for an understanding of the claimed subject matter, FIG. 18 does not show some of the typical components of many computing devices. In this regard, the computing device 1800 may include input devices, such as a keyboard, keypad, mouse, microphone, touch input device, touch screen, tablet, and/or the like. Such input devices may be coupled to the computing device 1800 by wired or wireless connections including RF, infrared, serial, parallel, Bluetooth, Bluetooth low energy, USB, or other suitable connections protocols using wireless or physical connections. Similarly, the computing device 1800 may also include output devices such as a display, speakers, printer, etc. Since these devices are well known in the art, they are not illustrated or described further herein.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a computing system, cause the computing system to perform actions for detecting anomalies in time series data records, the actions comprising:

receiving, by an anomaly detection system, a new time series data record from an autonomous vehicle;

processing, by the anomaly detection system, the new time series data record with a machine learning model to detect anomalies; and in response to detecting an anomaly:

determining, by the anomaly detection system, an action to be taken to address the anomaly, wherein the action to be taken to address the anomaly is at least one of navigating to an emergency repair location, immediately performing a landing procedure, or rescheduling a future trip; and transmitting, by the anomaly detection system, a command that causes the action to be taken to address the anomaly;

wherein the machine learning model was trained using a technique that includes:

receiving, by a computing system, a plurality of time series data records, wherein the plurality of time series data records includes at least one anomalous time series data record;

initializing, by the computing system, the machine learning model having a set of fitting weights and a set of time series data record weights;

optimizing, by the computing system, the set of fitting weights of the machine learning model using the plurality of time series data records while holding the set of time series data record weights of the machine learning model constant, wherein optimizing the set of fitting weights using the plurality of time series data records includes using the time series data record weights to identify one or more anomalous time series data records of the plurality of time series data records to be ignored during optimization;

optimizing, by the computing system, the set of time series data record weights while holding the set of fitting weights constant; and repeating, by the computing system, the optimizing the set of fitting weights after the optimizing the set of time series data record weights at least one time .

2. The non-transitory computer-readable medium of claim 1, wherein the technique further includes determining the anomaly threshold value.

3. The non-transitory computer-readable medium of claim 1, wherein the plurality of time series data records include telemetry information from one or more autonomous vehicles.

4. The non-transitory computer-readable medium of claim 3, wherein the one or more autonomous vehicles includes at least one unmanned aerial vehicle (UAV).

5. The non-transitory computer-readable medium of claim 4, wherein the UAV includes at least one horizontal propulsion unit and at least one vertical propulsion unit.

6. The non-transitory computer-readable medium of claim 4, wherein the telemetry information includes information from at least two of a takeoff portion of a trip, a cruise portion of the trip, and a landing portion of the trip.

7. The non-transitory computer-readable medium of claim 4, wherein the time series data records include data that represents at least one of a motor speed, a control surface servo position, a linear velocity, an orientation, and an angular velocity.

8. A computer-implemented method of detecting and addressing anomalies in autonomous vehicle telemetry data, the method comprising:

receiving, by an anomaly detection system, a new time series data record from an autonomous vehicle;

processing, by the anomaly detection system, the new time series data record with a machine learning model to generate an anomaly score; and in response to determining that the anomaly score is greater than an anomaly threshold value:

determining, by the anomaly detection system, an action to be taken to address the anomaly, wherein the action to be taken to address the anomaly is at least one of navigating to an emergency repair location, immediately performing a landing procedure, or rescheduling a future trip; and transmitting, by the anomaly detection system, a command that causes the action to be taken to address the anomaly;

wherein the machine learning model was trained using a technique that includes:

initializing, by a computing system, a set of fitting weights for the machine learning model, wherein the fitting weights are used by the machine learning model to determine anomaly scores for new time series data records;

initializing, by the computing system, a set of time series data record weights associated with a training data set, wherein each time series data record weight is associated with a time series data record of a plurality of time series data records in the training data set, and wherein the time series data record weights are usable to identify one or more anomalous time series data records of the training data set to be ignored during optimization of the set of fitting weights; and training, by the computing system, the machine learning model by alternating at least two times between using the set of time series data record weights while optimizing the set of fitting weights based on the training data set, and using the set of fitting weights while optimizing the set of time series data record weights, wherein using the set of time series data record weights while optimizing the set of fitting weights includes ignoring at least one of the plurality of time series data records in the training data set based on the time series data record weights.

9. The computer-implemented method of claim 8, wherein the autonomous vehicle is an unmanned aerial vehicle (UAV).

10. The computer-implemented method of claim 9, wherein the UAV includes at least one horizontal propulsion unit and at least one vertical propulsion unit.

11. The computer-implemented method of claim 9, wherein the new time series data record includes telemetry information from at least two of a takeoff portion of a trip, a cruise portion of the trip, and a landing portion of the trip.

12. The computer-implemented method of claim 9, wherein the new time series data record includes data representing at least one of a motor speed, a control surface servo position, a linear velocity, an orientation, and an angular velocity.

13. The computer-implemented method of claim 8, wherein the technique further includes determining the anomaly threshold value.

14. A system, comprising:

an autonomous vehicle; and an anomaly detection system communicatively coupled to the autonomous vehicle, the anomaly detection system having at least one computing device that includes at least one processor and a non-transitory computer-readable medium having logic stored thereon that, in response to execution by the at least one processor, causes the anomaly detection system to perform actions comprising:

receiving, by the anomaly detection system, a new time series data record from the autonomous vehicle;

processing, by the anomaly detection system, the new time series data record with a machine learning model to generate an anomaly score; and in response to determining that the anomaly score is greater than an anomaly threshold value:

determining, by the anomaly detection system, an action to be taken to address the anomaly; and transmitting, by the anomaly detection system, a command to the autonomous vehicle that identifies the action to be taken; and wherein the autonomous vehicle is configured to:

receive the command from the anomaly detection system; and autonomously perform the action identified by the command;

wherein the machine learning model was trained using a technique that includes:

initializing, by a computing system, a set of fitting weights for the machine learning model, wherein the fitting weights are used by the machine learning model to determine anomaly scores for new time series data records;

initializing, by the computing system, a set of time series data record weights associated with a training data set, wherein each time series data record weight is associated with a time series data record of a plurality of time series data records in the training data set, and wherein the time series data record weights are usable to identify one or more anomalous time series data records of the training data set to be ignored during optimization of the set of fitting weights; and training, by the computing system, the machine learning model by alternating at least two times between using the set of time series data record weights while optimizing the set of fitting weights based on the training data set, and using the set of fitting weights while optimizing the set of time series data record weights, wherein using the set of time series data record weights while optimizing the set of fitting weights includes ignoring at least one of the plurality of time series data records in the training data set based on the time series data record weights.

15. The system of claim 14, wherein the technique further includes determining the anomaly threshold value.

16. The system of claim 14, wherein the plurality of time series data records includes telemetry information from one or more autonomous vehicles that includes information from at least two of a takeoff portion of a trip, a cruise portion of the trip, and a landing portion of the trip, and wherein the time series data records include data that represents at least one of a motor speed, a control surface servo position, a linear velocity, an orientation, and an angular velocity.

17. The system of claim 14, wherein the autonomous vehicle is an unmanned aerial vehicle (UAV).

18. The system of claim 17, wherein the UAV includes at least one horizontal propulsion unit and at least one vertical propulsion unit.

19. The system of claim 17, wherein autonomously performing the action identified by the command includes at least one of navigating to an emergency repair location or immediately performing a landing procedure.

20. The system of claim 14, wherein the action to be taken to address the anomaly includes at least one of rescheduling a future trip or accepting remote control by a human operator.

*    *    *    *    *